US012190405B2

(12) United States Patent
Rimmer et al.

(10) Patent No.: US 12,190,405 B2
(45) Date of Patent: Jan. 7, 2025

(54) DIRECT MEMORY WRITES BY NETWORK INTERFACE OF A GRAPHICS PROCESSING UNIT

(71) Applicant: Intel Corporation, Santa Clara, CA (US)

(72) Inventors: Todd Rimmer, Exton, PA (US); Mark Debbage, Santa Clara, CA (US); Bruce G. Warren, Poulsbo, WA (US); Sayantan Sur, Portland, OR (US); Nayan Amrutlal Suthar, Pune (IN); Ajaya Durg, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 17/853,711

(22) Filed: Jun. 29, 2022

(65) Prior Publication Data

US 2022/0351326 A1  Nov. 3, 2022

Related U.S. Application Data

(60) Provisional application No. 63/218,832, filed on Jul. 6, 2021.

(51) Int. Cl.
*G06T 1/60* (2006.01)
*G06T 1/20* (2006.01)

(52) U.S. Cl.
CPC ............... *G06T 1/20* (2013.01); *G06T 1/60* (2013.01); *G06F 2213/3808* (2013.01)

(58) Field of Classification Search
CPC ...... G06T 1/20; G06T 1/60; G06F 2213/3808
See application file for complete search history.

(56) References Cited

U.S. PATENT DOCUMENTS

| 6,393,483 | B1 | 5/2002 | Latif et al. |
| 9,602,437 | B1 | 3/2017 | Bernath |
| 10,997,106 | B1 | 5/2021 | Bandaru et al. |
| 11,150,963 | B2 | 10/2021 | Nainar et al. |
| 11,531,752 | B2 | 12/2022 | Abodunrin et al. |
| 11,645,104 | B2 | 5/2023 | Rajagopal |

(Continued)

FOREIGN PATENT DOCUMENTS

| WO | 2020172692 A2 | 8/2020 | |
| WO | 2020190798 A1 | 9/2020 | |
| WO | WO-2020190801 A1 * | 9/2020 | ......... G06F 12/0215 |

OTHER PUBLICATIONS

AWS, "Amazon EC2 P4 Instances", https://aws.amazon.com/ec2/instance-types/p4/, Nov. 2, 2020, 8 pages.

(Continued)

*Primary Examiner* — Jeffery A Brier
(74) *Attorney, Agent, or Firm* — Compass IP Law PC

(57) ABSTRACT

Examples described herein relate to a first graphics processing unit (GPU) with at least one integrated communications system, wherein the at least one integrated communications system is to apply a reliability protocol to communicate with a second at least one integrated communications system associated with a second GPU to copy data from a first memory region to a second memory region and wherein the first memory region is associated with the first GPU and the second memory region is associated with the second GPU.

20 Claims, 17 Drawing Sheets

(56) References Cited

U.S. PATENT DOCUMENTS

| | | | |
|---|---|---|---|
| 11,863,376 | B2 | 1/2024 | Ang et al. |
| 11,995,024 | B2 | 5/2024 | Ang et al. |
| 2007/0139423 | A1 | 6/2007 | Kong et al. |
| 2007/0273699 | A1 | 11/2007 | Sasaki et al. |
| 2010/0013839 | A1 | 1/2010 | Rawson |
| 2014/0223131 | A1 | 8/2014 | Agarwal et al. |
| 2016/0337193 | A1 | 11/2016 | Rao |
| 2018/0314638 | A1 | 11/2018 | LeBeane et al. |
| 2018/0349062 | A1 | 12/2018 | Sines |
| 2019/0042741 | A1 | 2/2019 | Abodunrin et al. |
| 2020/0226096 | A1 | 7/2020 | Koker et al. |
| 2020/0278892 | A1 | 9/2020 | Nainar et al. |
| 2021/0203704 | A1 | 7/2021 | Pohl |
| 2022/0085916 | A1 | 3/2022 | Debbage et al. |
| 2022/0100491 | A1 | 3/2022 | Voltz et al. |
| 2022/0197681 | A1 | 6/2022 | Rajagopal |
| 2023/0041806 | A1 | 2/2023 | Singh |
| 2023/0195675 | A1 | 6/2023 | Ang et al. |
| 2023/0198833 | A1 | 6/2023 | Ang et al. |

OTHER PUBLICATIONS

Bouffler, Brendan, "In the search for performance, there's more than one way to build a network", AWS HPC Blog, https://aws.amazon.com/blogs/hpc/in-the-search-for-performance-theres-more-than-one-way-to-build-a-network/, Jun. 22, 2021, 5 pages.

Gebara, Nadeen et al., "In-Network Aggregation for Shared Machine Learning Clusters", Proceedings of the 4th MLSys Conference, San Jose, CA, USA, 2021, 16 pages.

Nvidia, "DGX Station A100 User Guide", DU-10189-001 v5.0.2, https://docs.nvidia.com/dgx/dgx-station-a100-user-guide/index.html, Nov. 2022, 74 pages.

Singhvi, Arjun et al., "1RMA: Re-envisioning Remote Memory Access for Multi-tenant Datacenters", SIGCOMM '20, Aug. 10-14, 2020, Virtual Event, NY, USA, 14 pages.

'Enhancing Networks with SmartNICs' by Mellanox, copyright 2018. (Year: 2018).

First Office Action for U.S. Appl. No. 17/853,793, Mailed Jul. 26, 2024, 26 pages.

'HyperV: A High Performance Hypervisor for Virtualization of the Programmable Data Plane' by Cheng Zhang et al., 2017 26th International Conference on Computer Communication and Networks (ICCCN), Jul. 2017. (Year: 2017).

'HyperVDP: High-Performance Virtualization of the Programmable Data Plane' by Cheng Zhang et al., IEEE Journal on Selected Areas in Communications, vol. 37, No. 3, Mar. 2019. (Year: 2019).

'P4NFV: P4 Enabled NFV Systems with SmartNICs' by Ali Mohammadkhan et al., 2019 IEEE Conference on Network Function Virtualization and Software Defined Networks (NFV-SDN). (Year: 2019).

'Uno: Unifying Host and Smart NIC Offload for Flexible Packet Processing' by Yanfang Le et al., SoCC '17, Sep. 24-27, 2017. (Year: 2017).

International Search Report and Written Opinion for PCT Patent Application No. PCT/US22/36397, Mailed Oct. 24, 2022, 12 pages.

U.S. Appl. No. 17/853,793, filed Jun. 29, 2022, 60 pages.

* cited by examiner

DIRECT MEMORY WRITES BY NETWORK INTERFACE OF A GRAPHICS PROCESSING UNIT

RELATED APPLICATION

This application claims priority to U.S. Provisional Application No. 63/218,832, filed Jul. 6, 2021. The entire contents of that application are incorporated by reference in its entirety.

BACKGROUND

In data centers, graphics processing units (GPUs), central processing units (CPUs), field programmable gate arrays (FPGAs), memory, and other devices are shared by applications as part of Infrastructure-as-a-service (IaaS) or as part of a composable Data Center (DC). Shared resources in datacenters are used for High Performance Computing (HPC), Machine Learning (ML), and Artificial Intelligence (AI) training and inference applications. HPC, ML, and AI training can utilize large amounts of compute and communications resources.

DETAILED DESCRIPTION

The increase in AI training model complexity and size has brought with it a significant increase in time to train. Multiple platforms with a copy of all or part of the model can work closely in an HPC manner to execute AI training algorithms in a parallel distributed manner. As a result, these platforms communicate with one another by high speed, low latency networks.

Figure 1:
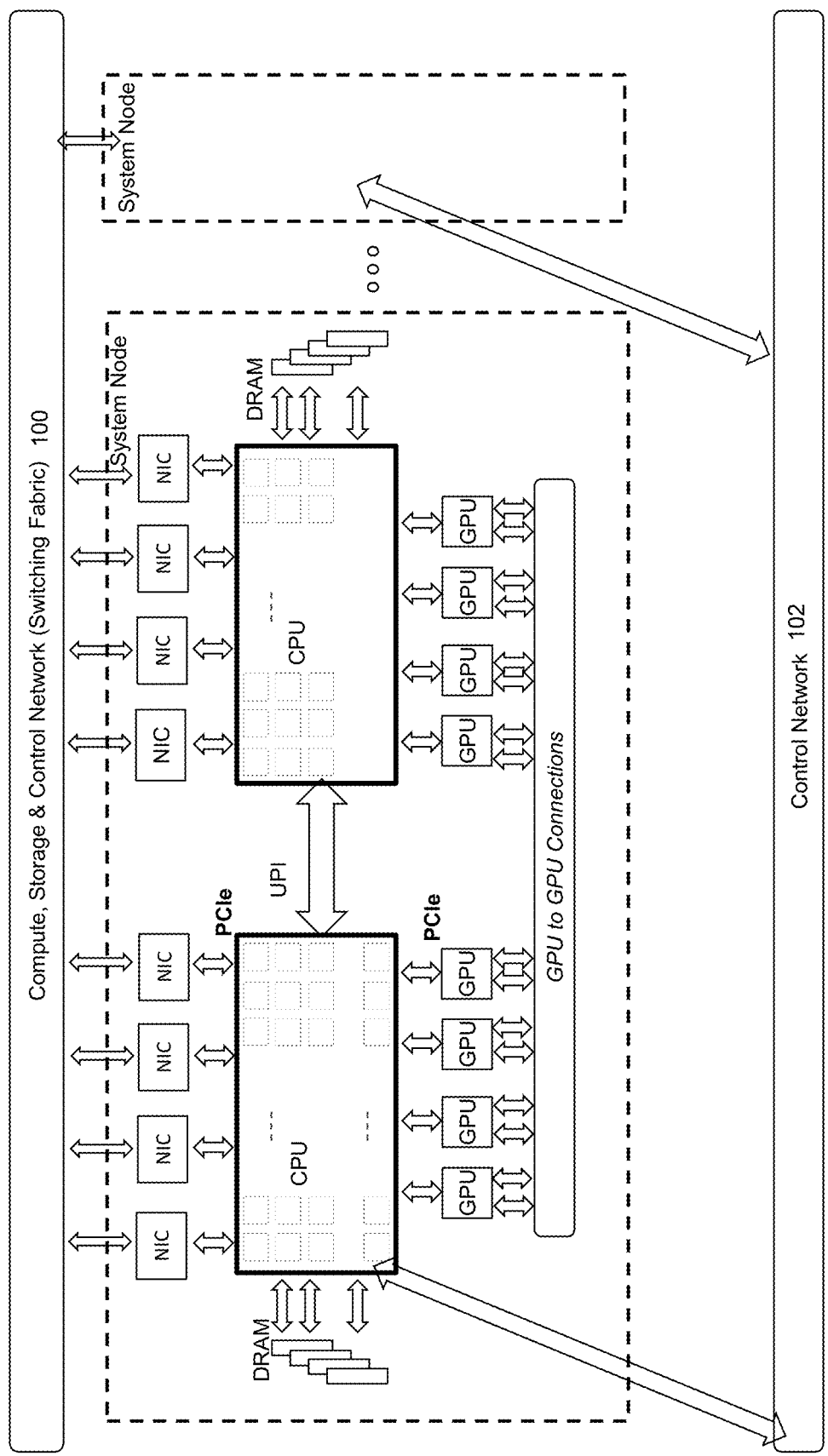
FIG. 1 depicts an example system.

FIG. 1 depicts an example AI training solution. An AI training platform (e.g., System Node) includes 2 CPUs and 8 GPUs and 8 High Speed network interface controllers (NICs) that communicate using Ethernet, InfiniBand, Omni-Path, etc. However, the numbers and ratios of CPUs, GPUs, and NICs may vary. The CPUs, GPUs, and NICs can communicate via a local platform input output (IO) bus (e.g., Peripheral Component Interconnect express (PCIe), Compute Express Link (CXL), or Intel® Ultra Path Interconnect (UPI)). The design of the IO bus can provide CPU, NIC or GPU may to another CPU, NIC or GPU within the platform. However, the throughput performance of the IO bus may vary depending on which pair of devices are interacting. As such, a GPU can be physically proximate to a NIC, such as for frequent communication. One or more integrated NICs may communicate with proprietary protocols, or standardized remote direct memory access (RDMA) protocols (e.g., InfiniBand, remote direct memory access (RDMA) over Converged Ethernet (RoCE), RoCEv2, and so forth).

During AI training workloads, the AI model can be executed in a distributed manner across multiple GPUs within the platform. GPUs can utilize multiple high speed connections (two shown for brevity, but 1-10 or more can be used). Connections can be arranged in an on-platform GPU-to-GPU connection topology. Connections can include direct GPU-to-GPU links (e.g., a point-to-point, multiple-to-multiple, or all-to-all topology) or it may utilize internal or external switches in a variety of other topologies (e.g., CLOS, torus, mesh, etc.). One existing example of such GPU-to-GPU is nvLink (Nvidia®).

System Node platforms can be connected with other system node platforms via switching fabric 100. Switching fabric 100 can provide system node-to-system node communications for distributed AI training applications, access to storage, and access to the control functions (e.g., job scheduling, provisioning, etc.) for the cluster and datacenter. In addition, some deployments may utilize network connectivity of control network 102. Control network 102 can be to a CPU Platform Controller Hub (PCH) and Baseboard Management Controller (BMC) integrated NIC or a discrete NIC (not shown) to manage platform operations such as power utilization, environmentals (e.g., voltage, power, cooling, heater), server shutdown, server boot, server reboot, etc. Control plane network may also be connected to low speed control plane interfaces on switches (not shown) in switching fabric.

Figure 2:
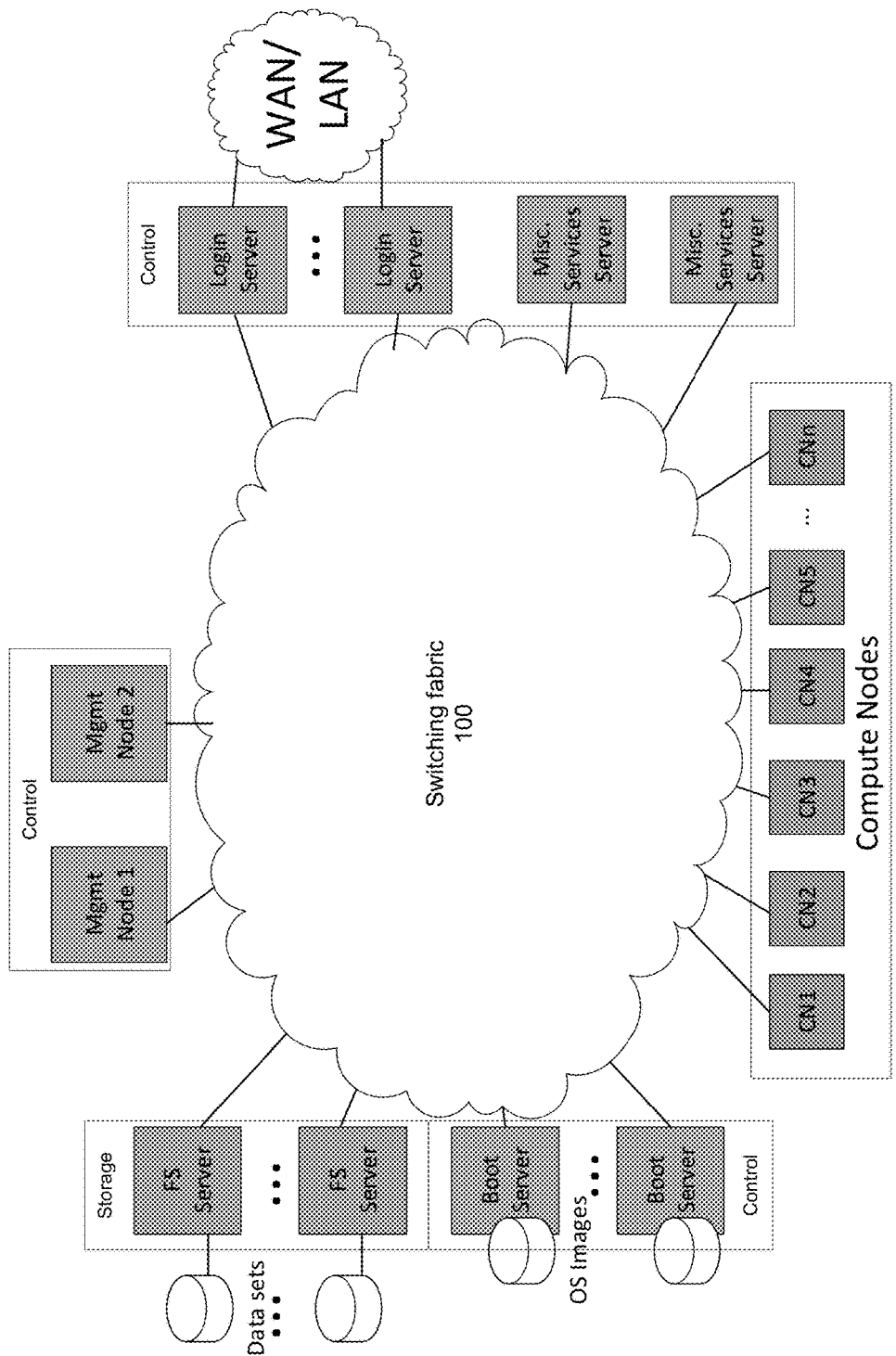
FIG. 2 depicts an example system.

FIG. 2 depicts an on-premises deployment of platforms for AI training or HPC. A High Performance Computing (HPC) cluster can include compute, storage and control plane. Storage, compute and control can be separated virtually or physically. For example, compute can utilize artificial intelligence (AI) communications libraries or Message Passing Interface (MPI). Storage can include parallel filesystem (filesys), filesys routing or bridging. Control plane can perform job management, operating system (OS) provisioning, fabric management, and server and IO device management. Services, such as filesystem (FS server), boot/provisioning, login (e.g., end user access from wide area network (WAN) or local area network (LAN)), Management (Mgmt) nodes can perform fabric management, job scheduling and other functions or services. Mgmt nodes can utilize CPUs without GPUs, but can utilize GPUs.

In cloud deployments in a datacenter or across datacenters, nodes can communicate via a reconfigurable hyperscale switching fabric (e.g., switching fabric 100). In the data centers, a server (e.g., boot, filesystem, management (mgmt) node, etc.) can interact with virtual clusters. A server can utilize a discrete NIC connected with a device interface to single fabric for storage, compute and control traffic. Some NICs support RDMA over Converged Ethernet (RoCE), Transmission Control Protocol over Internet Protocol (TCP/IP) support with security, virtualization, etc. One or more of the compute nodes is an instance of the System Node shown in FIG. 1.

Figure 3:
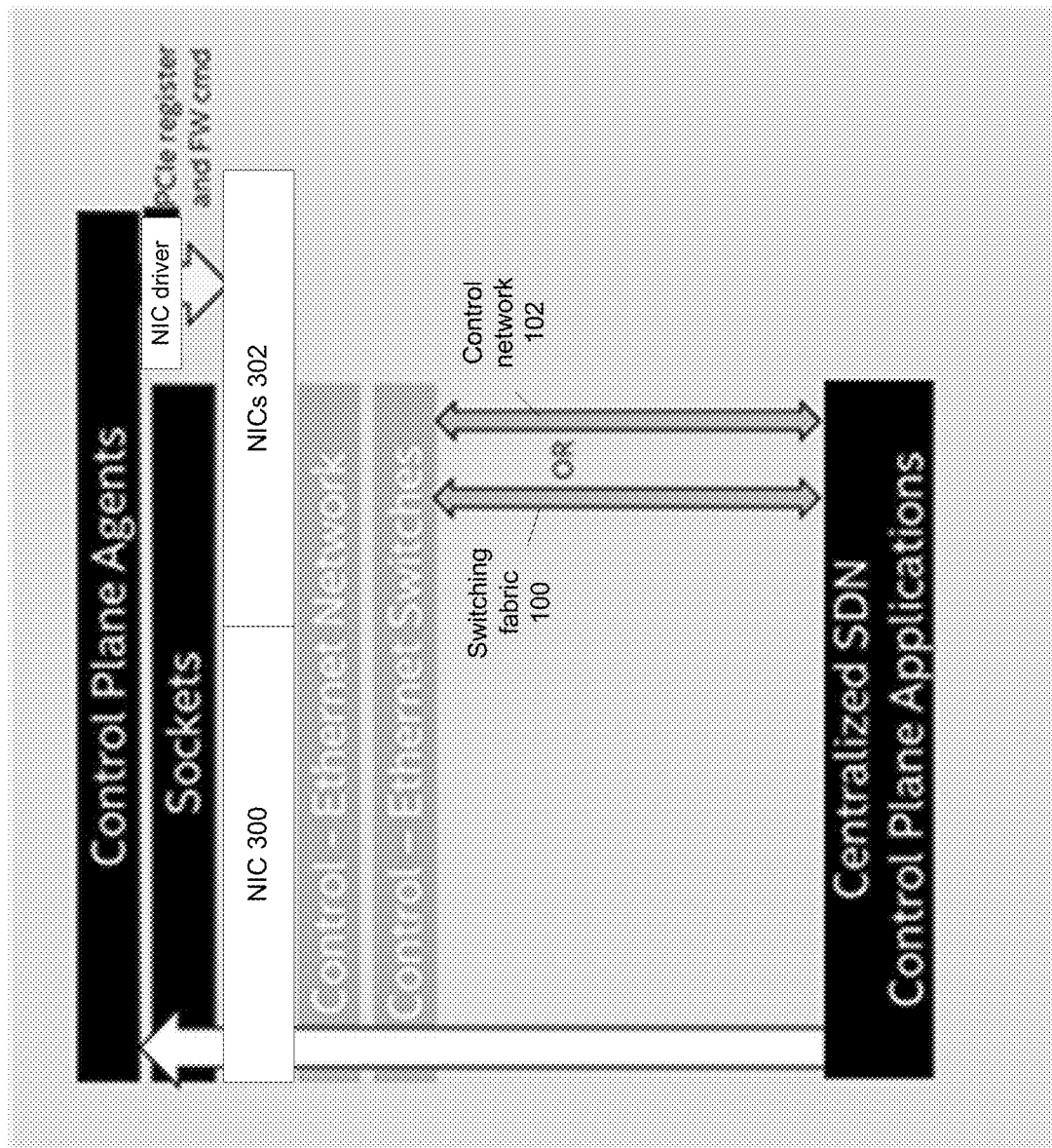
FIG. 3 depicts an example software stack.

FIG. 3 depicts a control plane software stack. Control of system node NICs can be accomplished using a switching fabric 100 or a dedicated control network 102. Management or service nodes can execute centralized software defined networking (SDN) control applications and utilize a control network (e.g., 100 or 102) and its Ethernet switches to communicate via one or more of the control plane NICs.

In a system node, sockets stack delivers control plane commands to a control plane agent. The control plane agent accesses, by NIC driver APIs, NIC registers and firmware across the PCIe bus to perform control plane operations such as querying telemetry data, configuring port attributes, configuring quality of service (QoS), security specifications, etc. As shown in FIG. 3, control plane commands may be delivered to the control plane agents via network interface controller (NIC) 300 connected to the control plane via switching fabric 100 or control network 102 and the control plane agents may perform control plane operations to configure other NICs 302 (e.g., NICs integrated into one or more GPUs) in the platform. Control plane operations may include topology querying, switch status, and switch configuration. Control plane operations for primary network switches may be communicated via the primary network or via the control network.

At least to reduce latency of communications between GPUs, one or more NICs can be integrated into a GPU so that a same semiconductor die or a system on chip (SoC) can include a GPU and one or more integrated NICs for GPU-to-GPU communications. In some examples, a device interface is not used to provide communications between the NIC and GPU and a bus or other communications medium is used. Note that reference to GPU can instead refer to an XPU or an accelerator. An integrated NIC can use a reliability protocol to communicate with other integrated NICs to copy data from a first memory to a second memory by remote direct memory access (RDMA). Examples of reliability protocols are described herein.

Some example integrated NICs perform topology discovery to discover other integrated NICs. A management node can manage integrated NICs via a fabric. Out of band configuration of integrated NICs can occur. Integrated NICs can be configured to use a device interface such as PCIe or CXL or different even proprietary interfaces in order for the control plane agent to access registers and control operations within the integrated NICs.

Figure 4:
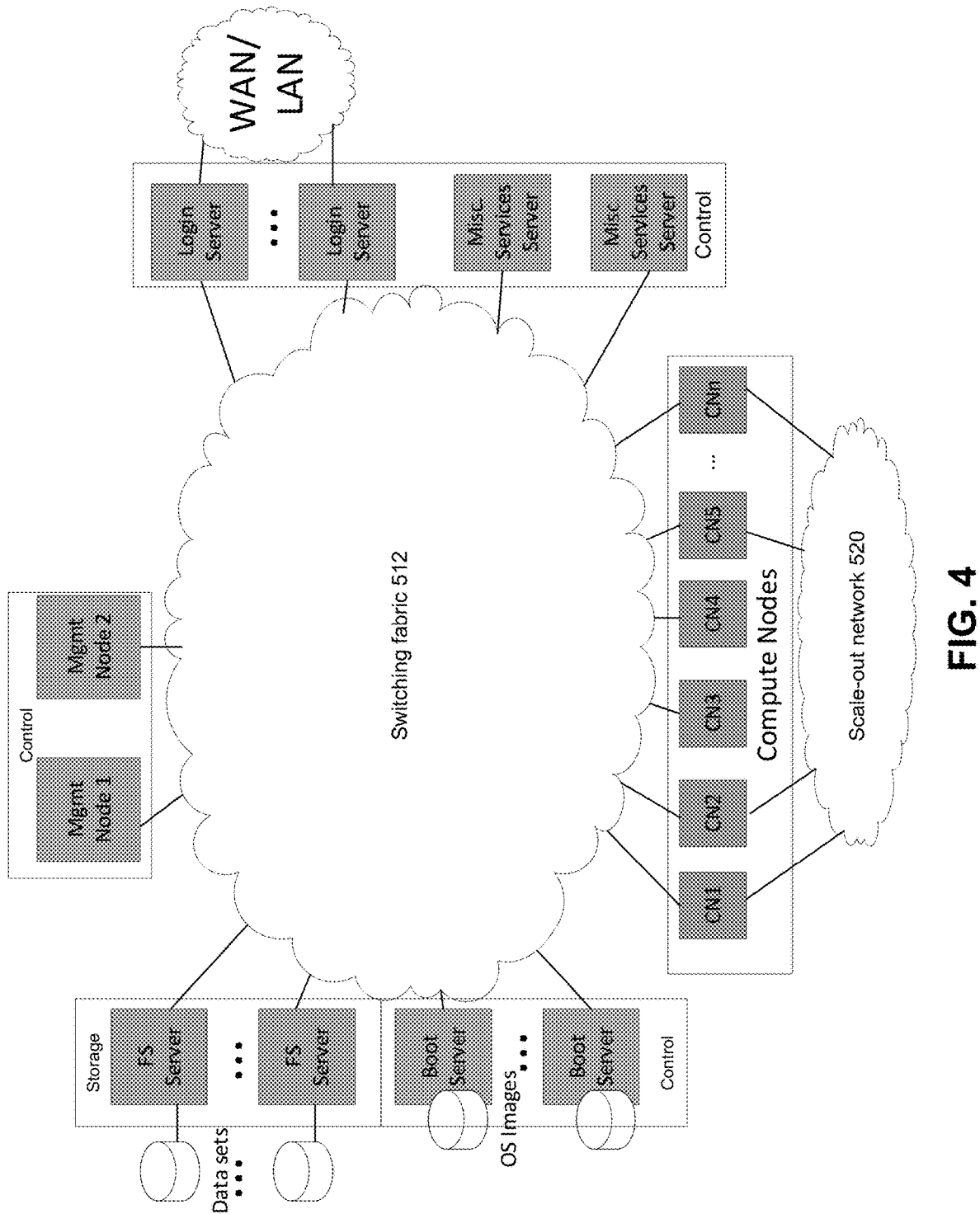
FIG. 4 illustrates an example system.

FIG. 4 depicts an example system. A scale out fabric or network 520 provides communications between compute nodes. Nodes can communicate with a data center via smart NICs or other types of NIC devices. The scale out network may be used to communicate with nodes in a POD. The size of a POD depends on datacenter design, but may typically be 10 s to 1000 s of compute nodes, while the data center can be at a scale of 100,000 s of nodes.

A tenant renting resources to run an AI training job in the cloud may be assigned a subset of compute nodes within a single POD along with other service nodes (Filesystem, job management, etc.) within the data center.

Figure 5:
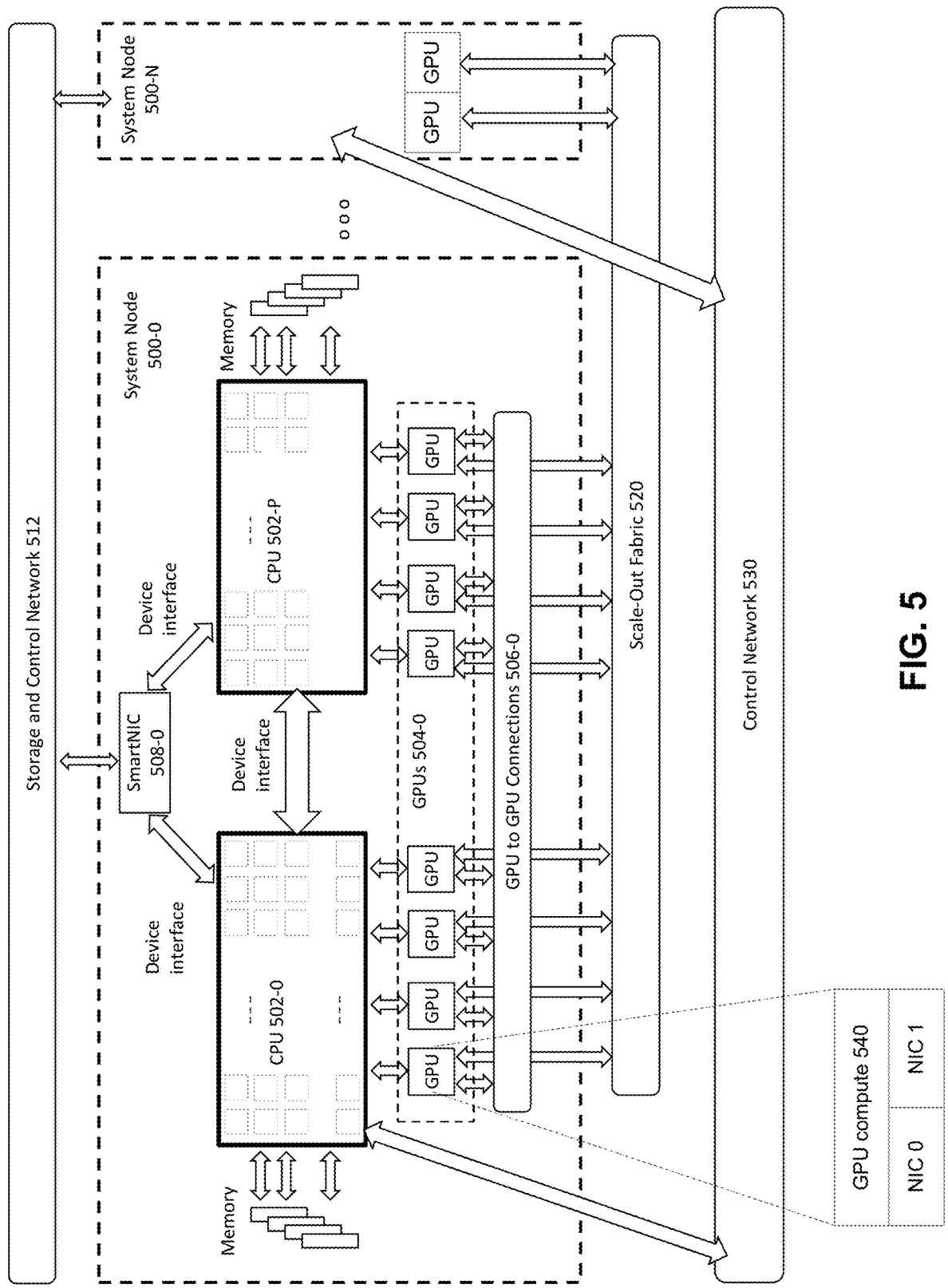
FIG. 5 depicts an example system.

FIG. 5 depicts an example system. System node 500-0 can include one or more CPUs 502-0 to 502-P (where P is an integer) and one or more GPUs 504-0 that communicate with one or more CPUs 502-0 to 502-P and one or more GPUs 504-0 of one or more other system nodes 500-1 to 500-N (where N is an integer). Various examples of one or more GPUs 504-0 are described herein at least with respect to FIGS. 10A, 10B, 10C, 10D, and/or 13.

A smartNIC or other network interface device 508-0 may provide connectivity using links and features such as RDMA and offloads including hardware and programmable engines. The smartNIC or other network interface device 508-0 can be used for data center communications between system node 500-0 and other system nodes 500-1 to 500-N or non-compute nodes (e.g., storage, boot, management, control node, etc.). For example, network interface device 508-0 can include one or more of: a network interface controller (NIC), a remote direct memory access (RDMA)-enabled NIC, router, switch, forwarding element, infrastructure processing unit (IPU), or data processing unit (DPU). Various examples of network interface devices are described at least with respect to FIG. 11. Description of system node 500-0 can apply to one or more of system nodes 500-1 to 500-N.

GPU-to-GPU connections 506-0 can be utilized for communications among GPUs of GPUs 504-0. Scale-out fabric 520 can provide communication between one or more of GPUs 504-0 and one or more GPUs of another system node. One or more of GPUs 504-0 can be coupled to one or more of GPUs 504-0 through one or more interfaces or NICs to GPU-to-GPU connections 506-0 and scale-out fabric 520. One or more of GPUs 504-0 can include multiple interfaces or NICs. A first set of one or more interfaces or NICs built into GPU can connect to GPU-to-GPU connections 506-0. GPU-to-GPU connections 506-0 can transmit and receive communications in a manner consistent with one or more of: Intel® Omni-Path, Ethernet, Nvidia® NVLink, CXL, InfiniBand, or other protocols.

A second set of one or more interfaces or NICs built into GPU can connect to scale-out fabric 520. Various examples of interfaces or NICs connected to GPU-to-GPU connections 506-0 and scale-out fabric 520 are described with respect to FIGS. 7 and 8. Scale-out fabric 520 can transmit and receive communications in a manner consistent with one or more of: Intel® Omni-Path, Ethernet, Nvidia® NVLink, CXL, InfiniBand, or other protocols.

As shown in an example perspective of at least one GPU of GPUs 504-0, a GPU can include GPU compute circuitry 540 and at least NIC 0 and NIC 1. Various examples of NIC 0 and NIC 1 are described herein at least with respect to FIGS. 7, 8, and/or 11.

NIC 0 and NIC 1 can perform remote direct memory read or write operations between memory devices. For example, NIC 0 can be utilized to read or write data between GPUs of a single system node whereas NIC 1 can be used to read or write data between GPUs of within a system node or among different system nodes. NIC 0 can utilize lower security requirements than that of NIC 1, For example, for transactions using NIC 0 and NIC 1, virtual address protection can be performed in a memory management unit (MMU). NIC 1 can utilize virtual local area network (VLAN) tagging and authentication to limit source and destination, VxLANs, access control lists (ACLs), and so forth. NICs 0 and 1 can become part of the PCIe (or CXL) topology within a System Node and can be used by CPUs and GPUs in the System Node.

As part of reducing GPU NIC silicon die space and power usage, support for in-band control plane protocols by NIC 0 and/or NIC 1, which are integrated into a GPU, can be reduced. As such, to retain flexibility and performance of control plane protocols, smartNIC 508-0 (or the optional platform NIC connected to Control Network 530) can provide security and control functions for system node 500-0. SmartNIC 508-0 can configure system node NICs, CPUs, GPUs, and other devices with storage protocols, security, control operations based on communications from storage and control network 512. A software defined networking (SDN) controller can configure storage protocols, security (e.g., virtual local area networks (VLANs), Virtual Extensible LAN (VXLANs), multi-tenant partitioning, data encryption, etc.), by performing control operations for system nodes 500-0 to 500-N.

Out-of-band management ports of switches of scale out fabric 520 can be connected to storage and control network 512 and/or control plane network 530 for control plane operations such as topology query, switch status, and switch configuration. In the case of topology query, an in-band query to discover a topology of GPU NICs can be performed by control plane packet in-band transmission by GPU NICs, as described at least with respect to FIG. 9. By reducing control plane traffic in scale-out fabric 520, overhead and latency jitter on scale-out fabric 520 can be reduced.

For example, scale-out fabric 520 can support non-standard protocols to reduce overhead and increase message throughput. For example, scale-out fabric 520 can utilize one or more Protocol-independent Packet Processors (P4) programmable switches to implement changes to Ethernet headers and protocols to remove fields for increased message rate or reduced overhead.

Switches of scale-out fabric 520 need not use control plane security features such as packet encryption and authentication. Instead, low overhead approaches such as virtual local area network (VLAN) or isolation via routing can prevent cloud tenants from accessing nodes not assigned to them. However, switches of scale-out fabric 520 can use control plane security features such as packet encryption and authentication.

One or more interfaces or NICs can be built into GPU by formation on a same integrated circuit chip or different integrated circuit chips, same die or different dies, or same package or different packages. GPU and NICs can be communicatively coupled using chip-to-chip communications, die-to-die communications, packet-based communications, communications over a device interface, fabric-based communications, and so forth. A die-to-die communications can be consistent with Embedded Multi-Die Interconnect Bridge (EMIB) or utilize an interposer. GPU-to-GPU connections 506-0 can be on-platform with the GPUs, whereby GPU-to-GPU connections and optionally related switches could be part of a set of boards and cards of System Node 500-0.

Control network 530 can provide communications involving one or more of: PCH, BMC, voltage control, temperature control (e.g., heating, fans or cooling)), system administrator traffic, system control (e.g., shutdown, boot, reboot). Access to scale-out network 530 can occur using a NIC integrated into CPUs 502-0 to 502-P.

By use of a network and fabric, GPUs can communicate by low overhead, low latency and high bandwidth via scale out fabric 520 at least for distributed multi-GPU applications such as HPC or AI-training.

Figure 6:
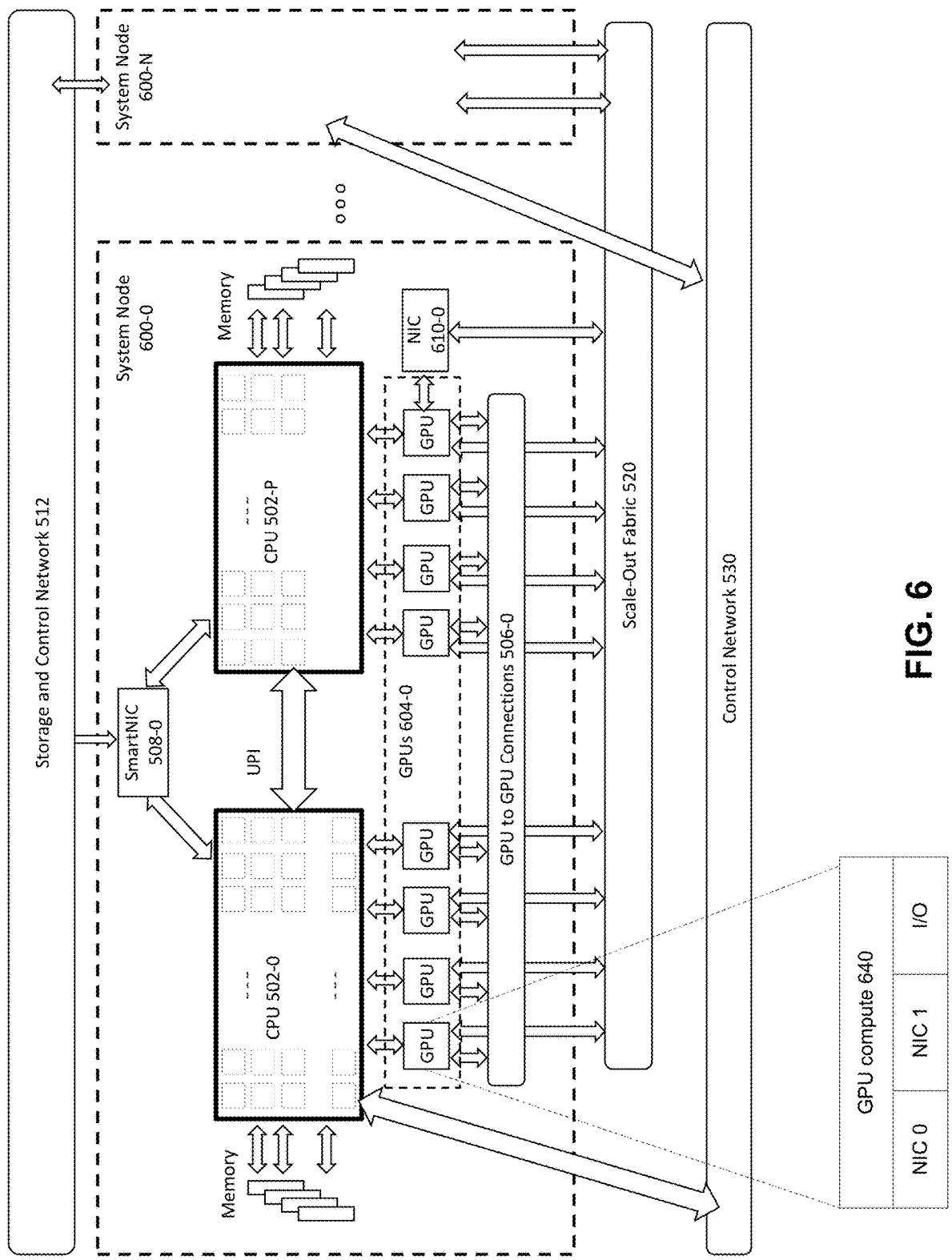
FIG. 6 depicts an example system.

FIG. 6 depicts an example system. System node 600 is similar to system node 500 and includes at least one discrete NIC 610-0 directly coupled to GPUs 504-0. Various examples of one or more GPUs 604-0 are described herein at least with respect to FIGS. 10A, 10B, 10C, 10D, and/or 13. A GPU can be flexibly configured to use a variety of types of NICs or connections (e.g., discrete NIC, integrated NIC, Ethernet NIC, Intel® Omnipath, etc.) and a variety of types of interfaces. Configuration of type of NIC or connection to use can occur at one or more: hardware design time, hardware manufacture, system configuration time, runtime, or others.

NIC 610-0 can provide communication to one or more of GPUs 604-0 of system node 600-0 and other GPUs of other system nodes through scale-out fabric 520. NIC 610-0 can be configured with features from third party vendors and such features can include RDMA, low latency memory access, low latency message passing, optimized collective operations, proprietary or standard protocols for high speed low latency communications, etc. NIC 610-0 can be connected to one or more GPUs 604-0 via a device interface or can be accessible for use by CPUs 502-0 to 502-P via a device interface. NIC 610-0 can be implemented as a network interface device and provide communication with protocols beyond those available by NIC 0 and NIC 1 and perform additional operations beyond those of NIC 0 and NIC 1, such as accelerator operations or offload operations. For example, NIC 610-0 can communicate using TCP, RDMA, or proprietary protocols, and can perform data encryption, data decryption, data compression, data decompression, message tag matching, collectives offloads, or other accelerator operations described herein, and so forth.

Figure 7:
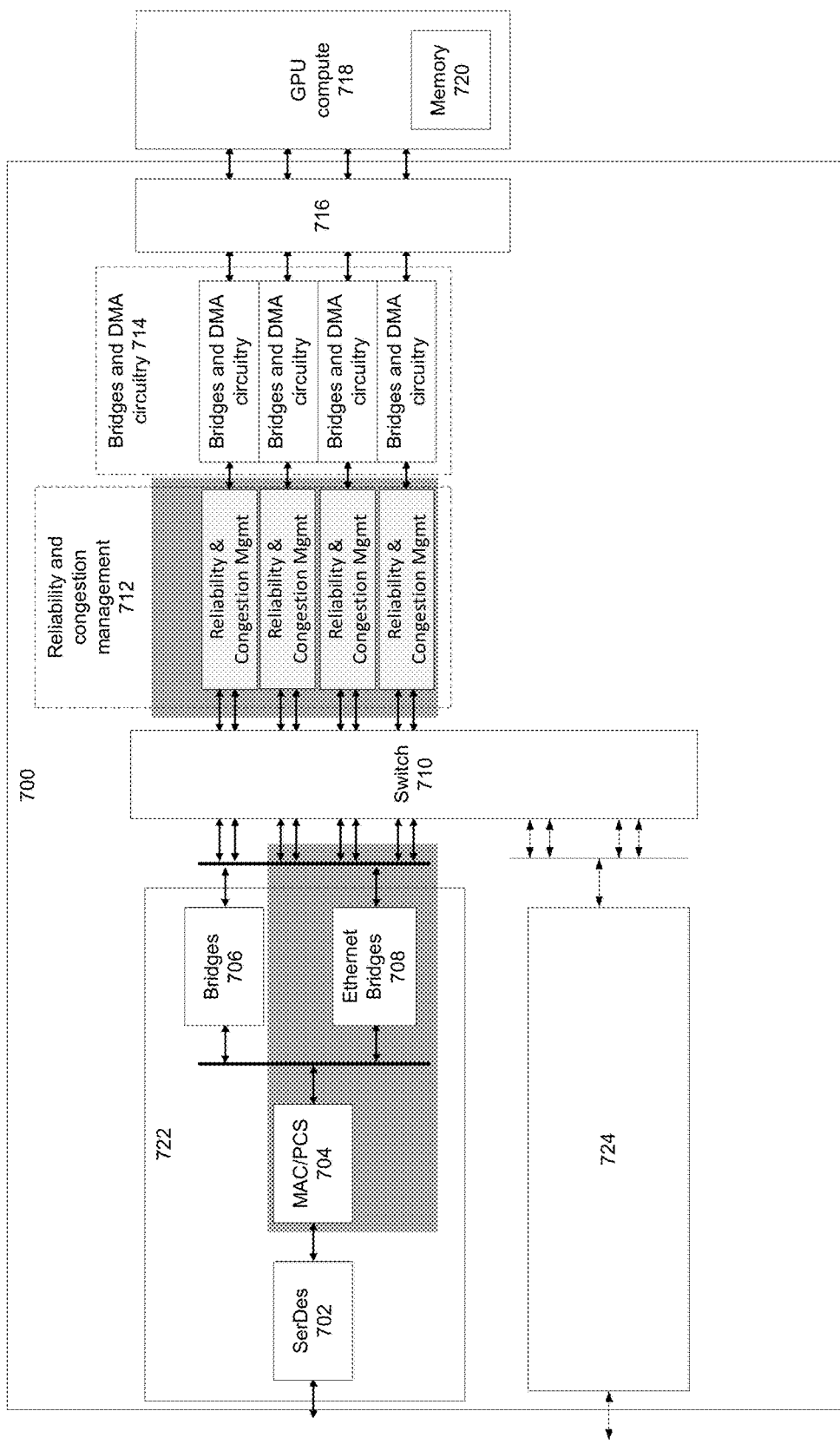
FIG. 7 depicts an example GPU.

FIG. 7 depicts circuitry of a GPU. For example, GPU compute 718 can utilize communications subsystem 700, that is integrated into a GPU as a NIC or interface. Some examples of GPU compute 718 can include elements of at least FIGS. 10A, 10B, 10C, 10D, and/or 13. A GPU may have more than two or more of subsystem 700 to increase a number of GPU-to-GPU connections and communications bandwidth.

Communications subsystem 700 may be configured to transmit and receive a mixture of GPU-to-GPU communications (e.g., via scale-out fabric 506) or scale out fabric communications (e.g., via scale-out fabric 520). Ratios of mixture of GPU-to-GPU communications or scale out fabric communications can be configurable at runtime or platform design time, allowing flexibility to design and deploy platforms for a specific sets of applications. Communications subsystem 700 can be configured at boot time at utilize bridges 706 or Ethernet bridges 708.

For example, bridges 706 can provide communications via fabric for GPU-to-multiple GPU connections. For example, bridges 706 can provide a network connection such as Intel® XeLink, Intel® Omni-Path, Ethernet, Nvidia® NVLink, CXL, InfiniBand, or other protocols.

Ethernet bridges 708 can provide at least one Ethernet connection between GPU compute 718 to one or more GPUs via a scale out network. Ethernet bridges 708 can perform Ethernet packet processing for transmitted and received packets. The scale out network can be consistent with one or more of: Ethernet, Intel® Omni-Path, Intel® XeLink, Nvidia® NVLink, CXL, InfiniBand, or other protocols. Ethernet bridges 708 can transmit a mixture of GPU-to-GPU connection traffic (e.g., 506-0) and scale out fabric traffic (e.g., 520) from a port, and a switch 710 could forward traffic to provide GPU traffic to one or more interfaces 722, to scale out fabric via Ethernet bridges 708, or to reliability and congestion management circuitries 712. A switch could also forward traffic from one interface 722 to interface 724. Interface 724 can be similar to interface 722. While merely interface 722 and 724 are shown, more than two interfaces can be utilized by GPU compute 718. GPU-to-GPU traffic can be received by switch 710 and provided to another GPU via switch 710 associated with the other GPU or via scale-out fabric. Switch 710 can provide connection to another GPU compute device.

Serdes 702 can receive packets from a scale out fabric and transmit packets to scale out fabric. Physical layer protocol block 704 can perform Ethernet media access control (MAC) and physical coding sublayer (PCS) operations for Ethernet packets from Bridges 706 and/or Ethernet bridges 708. In some examples, multiple Serdes are used, allowing multiple connections per instance of subsystem 700.

Reliability and congestion management circuitries 712 can include one or more reliability and congestion management circuitries for communications to or from GPU compute 718 or memory 720. Communications can occur between different addressable memory regions of a same memory device or different addressable memory regions of different memory device. For example, GPU-to-GPU communications for GPUs of a same system can read or write data between different addressable memory regions of a same memory device or different addressable memory regions of different memory device.

Reliability and congestion management circuitries 712 can perform a reliable transport for communications using GPU-to-GPU connections (e.g., GPU-to-GPU connections 506-0) and/or scale-out fabric (e.g., scale-out fabric 520), described next. For example, reliable transport can utilize a reliable transport protocol that tracks one or more gaps in received packet sequence numbers using a bitmap and indicates to a sender of packets non-delivered packets to identify a range of delivered packets. The bitmap can identify delivered packets and undelivered packets for one or more connections. Indicating to a sender of packets non-delivered packets to identify a range of delivered packets can include providing negative acknowledgement sequence range indicating a start and end of non-delivered packets. A range of delivered packets can be indicated by providing a sequence range indicating a start and end of non-delivered packets. A range of delivered packets can be identified by providing a sequence range indicating an acknowledgement up to and including a sequence number. Re-transmitting one or more packets can occur based on receipt of an indication of a range of non-delivered packets or timeout. For an example operation of reliability and congestion management circuitries 712, see, for example, U.S. Patent Application publication 2022/0085916, entitled "SCALABLE PROTOCOL-AGNOSTIC RELIABLE TRANSPORT."

Reliability and congestion management circuitries 712 can provide reliable communications, including performing packet loss recovery and congestion management. Reliable transport technologies can include one or more of: RDMA over Converged Ethernet (RoCE), Transmission Control Protocol (TCP), User Datagram Protocol (UDP), quick UDP Internet Connections (QUIC), High Precision Congestion Control (HPCC) (e.g., Li et al., "HPCC: High Precision Congestion Control" SIGCOMM (2019)), or other reliable transport protocols.

Bridges and direct memory access (DMA) circuitry 714 can copy data to and from GPU compute 718 and/or memory 720 (via interconnect 716) using load or store memory semantics and perform control functions (such as fence and flush). In connection with data reads from memory 720 and writes to memory 720, bridges and DMA circuitry 714 can perform direct memory access operations and apply configured memory access permissions and memory address translation tables (e.g., virtual to physical address translation).

Interconnect 716 can provide an interface to GPU compute 718. The interconnect can include an Intel® Multi-die Fabric Interface (MDFI), CXL, PCIe or other proprietary IO buses internal to the GPU, and so forth. GPUs can be formed on a same or different silicon die than that of interconnect. Interconnect 716 can provide an interface to GPU computational circuitry 718 and memory 720 to bridges and DMA circuitry 714.

Figure 8:
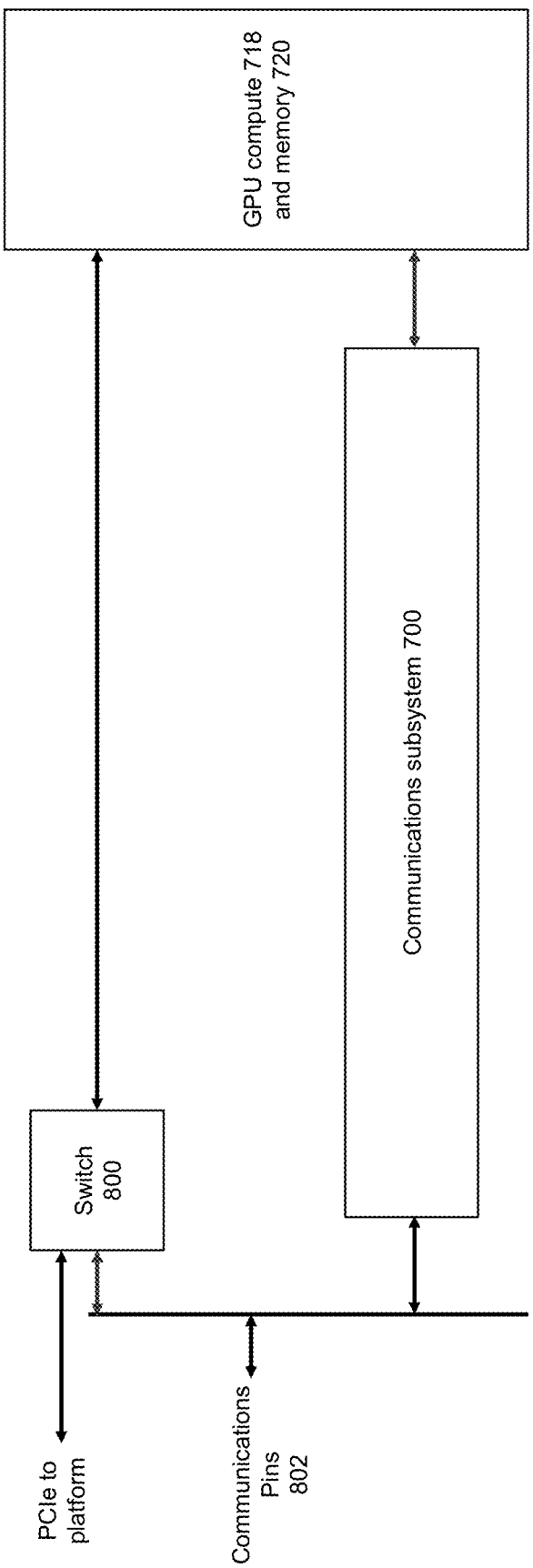
FIG. 8 depicts an example of GPU.

FIG. 8 depicts an example of a GPU. GPU compute 718 and memory 720 can utilize communication subsystem 700 and/or PCIe switch 800 for communications with one or more other GPUs. For example, GPU compute 718 utilize PCIe switch 800 to access a discrete NIC (e.g., NIC 610-0) to communicate with one or more other GPUs. For example, communications pins of a GPU socket can provide for PCIe connectivity to discrete NIC directly to the GPU. FIG. 8 shows communications pins can be multiplexed between the communications subsystem 700 and switch 800. Switch 800 can provide a connection to discrete PCIe NIC via communications pins 802, resulting in the discrete NIC being part of the overall platform topology via the connection. For example, where switch 800 and communication pins 802 are consistent with PCIe, discrete NIC can be part of the overall platform topology, such that discrete NIC 610-0 may be used as discussed, at least with respect to FIG. 6. FIG. 8 depicts use of a PCIe interface. However, other examples may make use of CXL, proprietary interfaces or other IO/memory buses and their corresponding switches.

Figure 9:
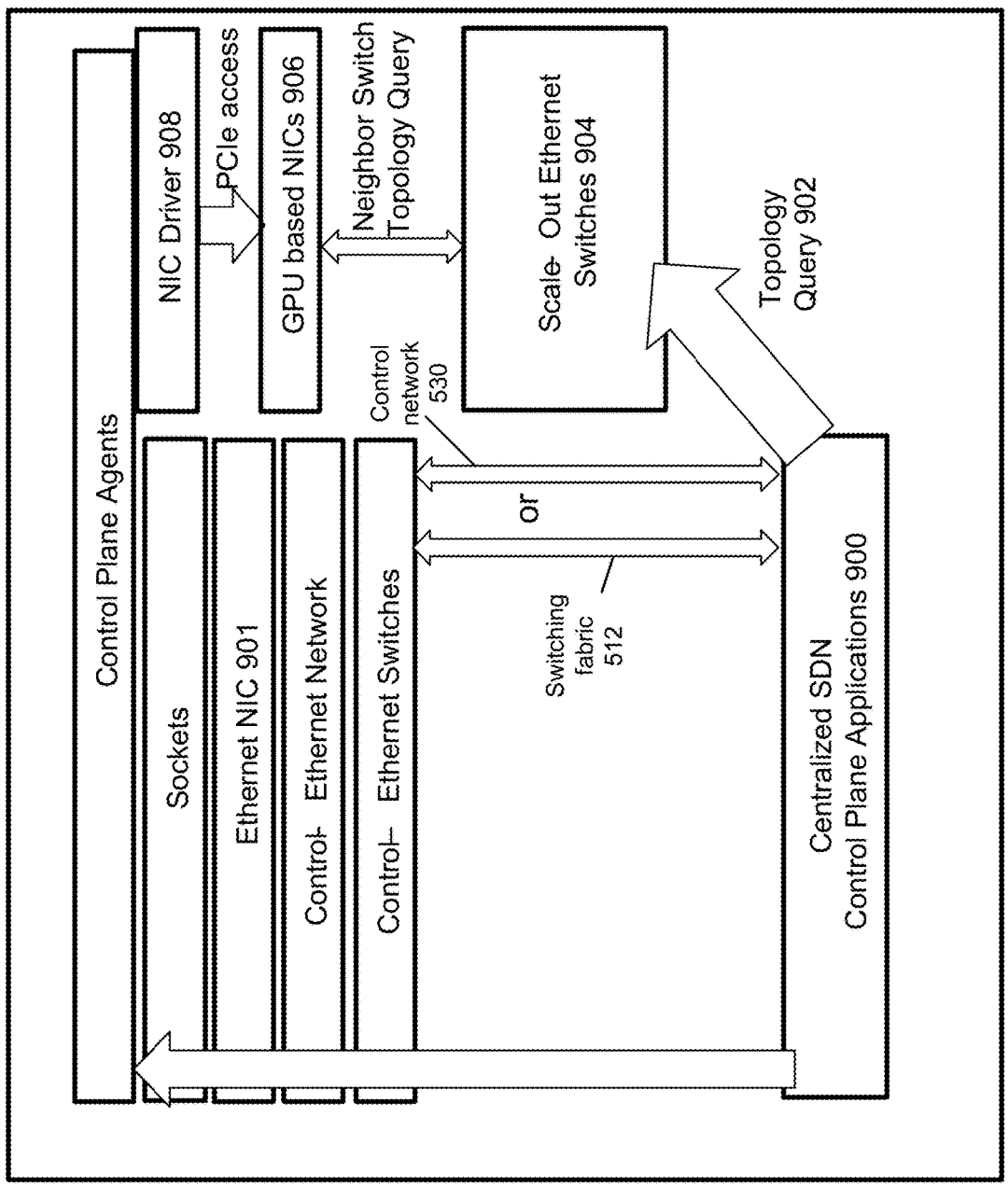
FIG. 9 depicts an example control plane software stack.

FIG. 9 depicts an example control plane software stack similar to FIG. 3. As in the stack of FIG. 3, control operations and queries may be delivered to the Control Plane Agents via Ethernet NICs 901 connected to the Control Plane (e.g., network 512 or 530). In addition, switches 904 of scale-out fabric 520 may use in-band packets, such as Link Layer Discovery Protocol (LLDP), to identify which GPU NIC 906 is connected to a given scale-out switch 904 port. Such topology query operations can permit Centralized SDN Control Plane Application 900 to identify network topology and connectivity of scale-out fabric 520 (e.g., which host name and MAC address is connected to a given scale out fabric switch 904 port). SDN application 900 may use the network topology and connectivity to further perform telemetry collection, routing determination, react to changes in the network and so forth via operations sent directly to Scale Out Switches 904 and/or via the Control Plane Agents to NIC Driver 908.

Topology discovery can be performed without execution of a full standard TCP/IP network stack on the GPU with integrated NIC 906. Instead, a GPU and/or GPU with integrated NIC 906 can execute an LLDP protocol and perform and manage RDMA communications and a CPU can execute a full TCP/IP stack (e.g., IP forwarding, TCP protocol, UDP protocol, and so forth) for the Control Plane Ethernet NIC 901. In some examples, a GPU need only support an LLDP protocol and RDMA communications for integrated NIC 906.

Figure 10A:
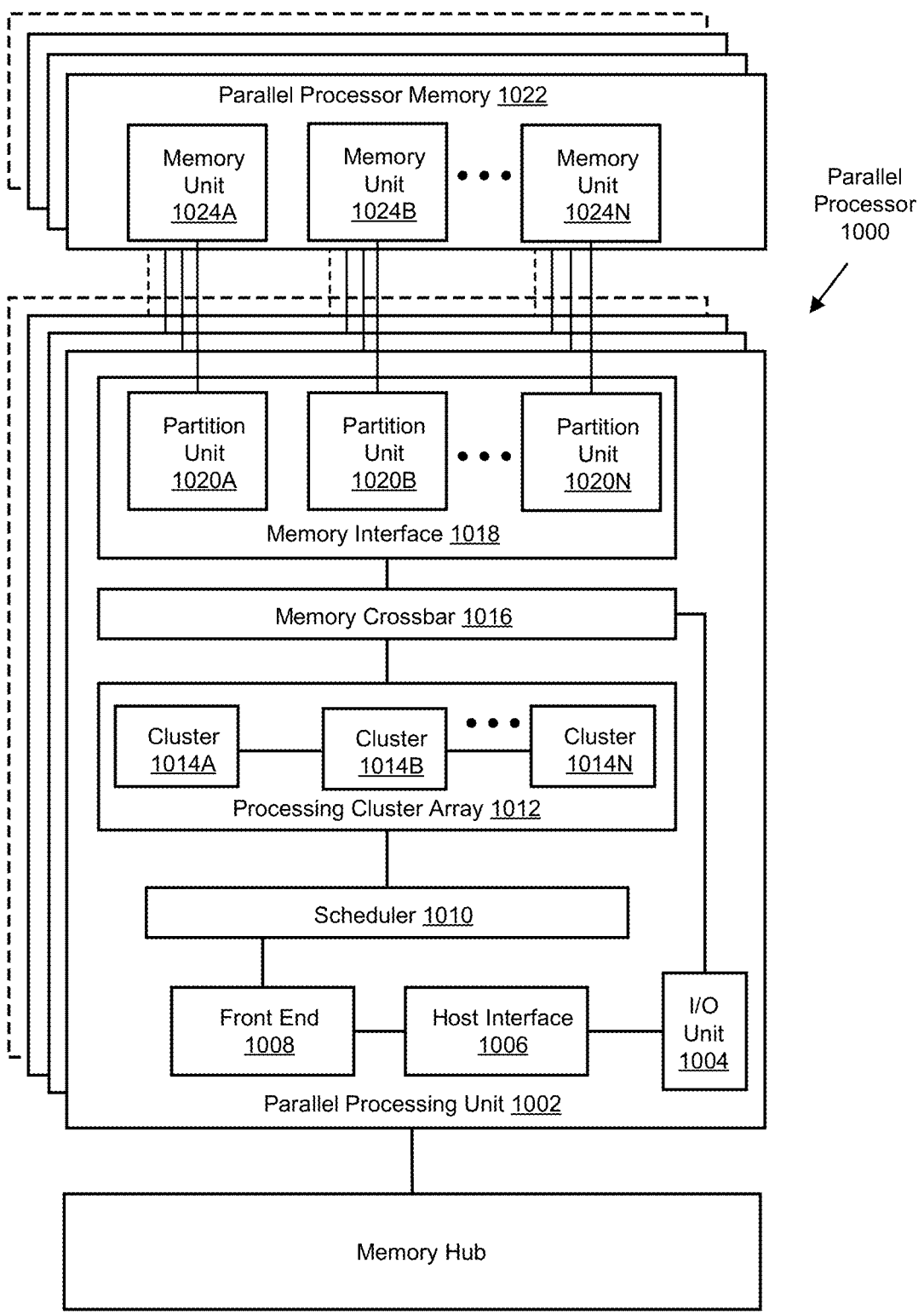
FIGS. 10A-10D depict example GPU compute components.

FIGS. 10A-10D depict example GPU compute components. FIG. 10A illustrates a parallel processor 1000. The parallel processor 1000 may be a GPU, GPGPU or the like as described herein. The various components of the parallel processor 1000 may be implemented using one or more integrated circuit devices, such as programmable processors, application specific integrated circuits (ASICs), or field programmable gate arrays (FPGA).

The parallel processor 1000 includes a parallel processing unit 1002. The parallel processing unit includes an I/O unit 1004 that enables communication with other devices, including other instances of the parallel processing unit 1002. The I/O unit 1004 may be directly connected to other devices. For instance, the I/O unit 1004 connects with other devices via the use of a hub or switch interface, such as a memory hub. The connections between the memory hub 105 and the I/O unit 1004 form a communication link. Within the parallel processing unit 1002, the I/O unit 1004 connects with a host interface 1006 and a memory crossbar 1016, where the host interface 1006 receives commands directed to performing processing operations and the memory crossbar 1016 receives commands directed to performing memory operations.

When the host interface 1006 receives a command buffer via the I/O unit 1004, the host interface 1006 can direct work operations to perform those commands to a front end 1008. In one embodiment the front end 1008 couples with a scheduler 1010, which is configured to distribute commands or other work items to a processing cluster array 1012. The scheduler 1010 configures processing cluster array 1012 is properly configured and in a valid state before tasks are distributed to the processing clusters of the processing cluster array 1012. The scheduler 1010 may be implemented via firmware logic executing on a microcontroller. The microcontroller implemented scheduler 1010 is configurable to perform complex scheduling and work distribution operations at coarse and fine granularity, enabling rapid preemption and context switching of threads executing on the processing cluster array 1012. Preferably, the host software can prove workloads for scheduling on the processing cluster array 1012 via one of multiple graphics processing doorbells. In other examples, polling for new workloads or interrupts can be used to identify or indicate availability of work to perform. The workloads can then be automatically distributed across the processing cluster array 1012 by the scheduler 1010 logic within the scheduler microcontroller.

The processing cluster array 1012 can include up to "N" processing clusters (e.g., cluster 1014A, cluster 1014B, through cluster 1014N). At least one of cluster 1014A-1014N of the processing cluster array 1012 can execute a large number of concurrent threads. The scheduler 1010 can allocate work to the clusters 1014A-1014N of the processing cluster array 1012 using various scheduling and/or work distribution algorithms, which may vary depending on the workload arising for a type of program or computation. The scheduling can be handled dynamically by the scheduler 1010 or can be assisted in part by compiler logic during compilation of program logic configured for execution by the processing cluster array 1012. Optionally, different clusters 1014A-1014N of the processing cluster array 1012 can be allocated for processing different types of programs or for performing different types of computations.

The processing cluster array 1012 can be configured to perform various types of parallel processing operations. For example, the processing cluster array 1012 is configured to perform general-purpose parallel compute operations. For example, the processing cluster array 1012 can include logic to execute processing tasks including filtering of video and/or audio data, performing modeling operations, including physics operations, and performing data transformations.

The processing cluster array 1012 is configured to perform parallel graphics processing operations. In such embodiments in which the parallel processor 1000 is configured to perform graphics processing operations, the processing cluster array 1012 can include additional logic to support the execution of such graphics processing operations, including, but not limited to texture sampling logic to perform texture operations, as well as tessellation logic and other vertex processing logic. Additionally, the processing cluster array 1012 can be configured to execute graphics processing related shader programs such as, but not limited to vertex shaders, tessellation shaders, geometry shaders, and pixel shaders. The parallel processing unit 1002 can transfer data from system memory via the I/O unit 1004 for processing. During processing the transferred data can be stored to on-chip memory (e.g., parallel processor memory 1022) during processing, then written back to system memory.

In embodiments in which the parallel processing unit 1002 is used to perform graphics processing, the scheduler 1010 may be configured to divide the processing workload into approximately equal sized tasks, to better enable distribution of the graphics processing operations to multiple clusters 1014A-1014N of the processing cluster array 1012. In some of these embodiments, portions of the processing cluster array 1012 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 1014A-1014N may be stored in buffers to allow the intermediate data to be transmitted between clusters 1014A-1014N for further processing.

During operation, the processing cluster array 1012 can receive processing tasks to be executed via the scheduler 1010, which receives commands defining processing tasks from front end 1008. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 1010 may be configured to fetch the indices corresponding to the tasks or may receive the indices from the front end 1008. The front end 1008 can configure the processing cluster array 1012 to a valid state before the workload specified by incoming command buffers (e.g., batch-buffers, push buffers, etc.) is initiated.

At least one of the one or more instances of the parallel processing unit 1002 can couple with parallel processor memory 1022. The parallel processor memory 1022 can be accessed via the memory crossbar 1016, which can receive memory requests from the processing cluster array 1012 as well as the I/O unit 1004. The memory crossbar 1016 can access the parallel processor memory 1022 via a memory interface 1018. The memory interface 1018 can include multiple partition units (e.g., partition unit 1020A, partition unit 1020B, through partition unit 1020N) that can couple to a portion (e.g., memory unit) of parallel processor memory 1022. The number of partition units 1020A-1020N may be configured to be equal to the number of memory units, such that a first partition unit 1020A has a corresponding first memory unit 1024A, a second partition unit 1020B has a corresponding second memory unit 1024B, and an Nth partition unit 1020N has a corresponding Nth memory unit 1024N. In other embodiments, the number of partition units 1020A-1020N may not be equal to the number of memory devices.

The memory units 1024A-1024N can include various types of memory devices, including dynamic random-access memory (DRAM) or graphics random access memory, such as synchronous graphics random access memory (SGRAM), including graphics double data rate (GDDR) memory. Optionally, the memory units 1024A-1024N may also include 3D stacked memory, including but not limited to high bandwidth memory (HBM). Persons skilled in the art will appreciate that the specific implementation of the memory units 1024A-1024N can vary and can be selected from one of various conventional designs. Render targets, such as frame buffers or texture maps may be stored across the memory units 1024A-1024N, allowing partition units 1020A-1020N to write portions of a render target in parallel to efficiently use the available bandwidth of parallel processor memory 1022. In some embodiments, a local instance of the parallel processor memory 1022 may be excluded in favor of a unified memory design that utilizes system memory in conjunction with local cache memory.

Optionally, one or more of the clusters 1014A-1014N of the processing cluster array 1012 has the ability to process data that will be written to one or more of the memory units 1024A-1024N within parallel processor memory 1022. The memory crossbar 1016 can be configured to transfer the output of at least one of cluster 1014A-1014N to one or more of partition unit 1020A-1020N or to another cluster 1014A-1014N, which can perform additional processing operations on the output. At least one of cluster 1014A-1014N can communicate with the memory interface 1018 through the memory crossbar 1016 to read from or write to various external memory devices. In one of the embodiments with the memory crossbar 1016 the memory crossbar 1016 has a connection to the memory interface 1018 to communicate with the I/O unit 1004, as well as a connection to a local instance of the parallel processor memory 1022, enabling the processing units within the different processing clusters 1014A-1014N to communicate with system memory or other memory that is not local to the parallel processing unit 1002. Generally, the memory crossbar 1016 may, for example, be able to use virtual channels to separate traffic streams between the clusters 1014A-1014N and the partition units 1020A-1020N.

While a single instance of the parallel processing unit 1002 is illustrated within the parallel processor 1000, other numbers of instances of the parallel processing unit 1002 can be included. For example, multiple instances of the parallel processing unit 1002 can be provided on a single add-in card, or multiple add-in cards can be interconnected. For example, the parallel processor 1000 can be an add-in device, which may be a graphics card such as a discrete graphics card that includes one or more GPUs, one or more memory devices, and device-to-device or network or fabric interfaces. The different instances of the parallel processing unit 1002 can be configured to inter-operate even if the different instances have different numbers of processing cores, different amounts of local parallel processor memory, and/or other configuration differences. Optionally, some instances of the parallel processing unit 1002 can include higher precision floating point units relative to other instances. Systems incorporating one or more instances of the parallel processing unit 1002 or the parallel processor 1000 can be implemented in a variety of configurations and form factors, including but not limited to desktop, laptop, or handheld personal computers, servers, workstations, game consoles, and/or embedded systems. An orchestrator can form composite nodes for workload performance using one or more of: disaggregated processor resources, cache resources, memory resources, storage resources, and networking resources.

Figure 10B:
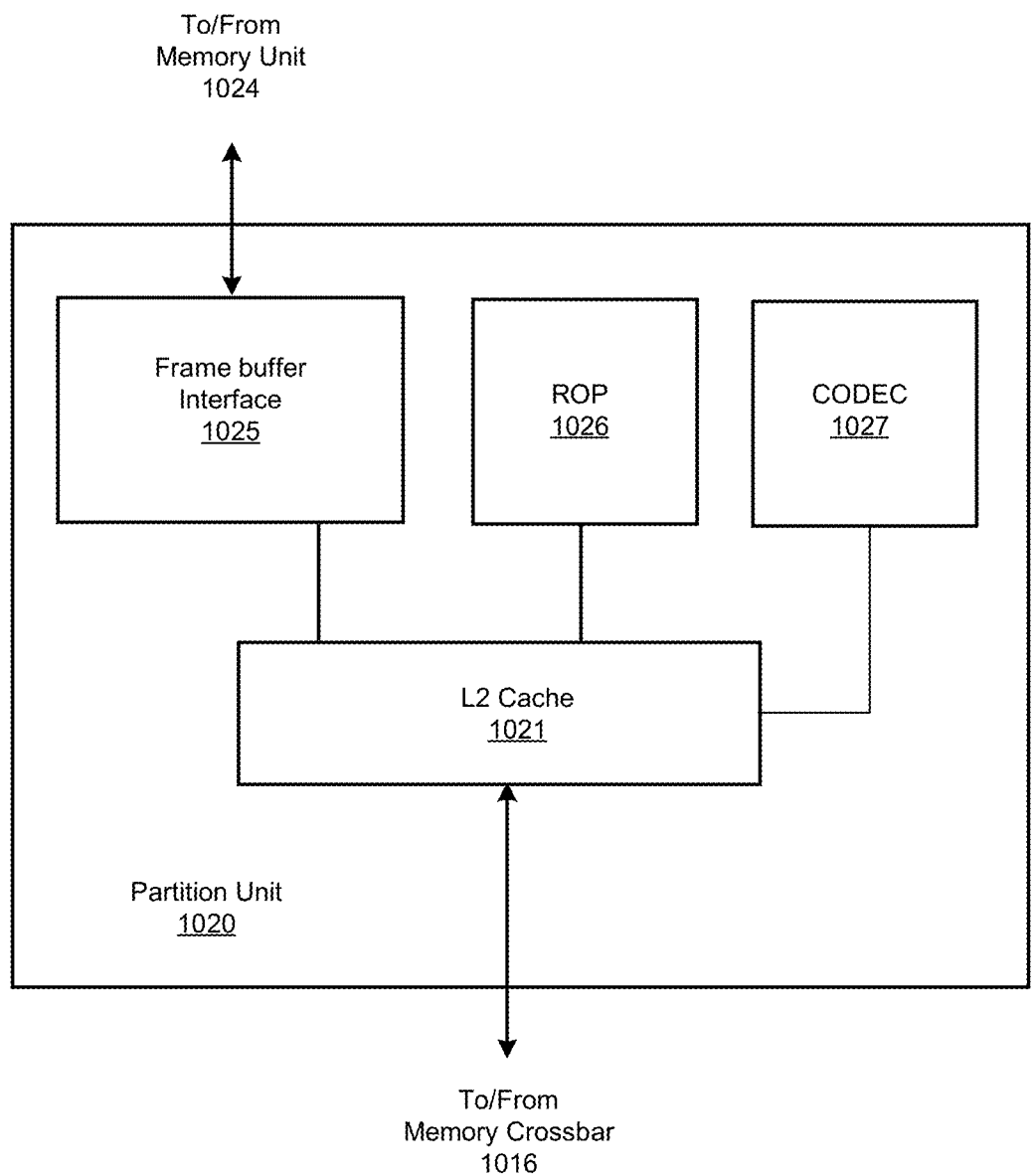

FIG. 10B is a block diagram of a partition unit 1020. The partition unit 1020 may be an instance of one of the partition units 1020A-1020N of FIG. 10A. As illustrated, the partition unit 1020 includes an L2 cache 1021, a frame buffer interface 1025, and a ROP 1026 (raster operations unit). The L2 cache 1021 is a read/write cache that is configured to perform load and store operations received from the memory crossbar 1016 and ROP 1026. Read misses and urgent write-back requests are output by L2 cache 1021 to frame buffer interface 1025 for processing. Updates can also be sent to the frame buffer via the frame buffer interface 1025 for processing. In one embodiment the frame buffer interface 1025 interfaces with one of the memory units in parallel processor memory, such as the memory units 1024A-1024N of FIG. 10A (e.g., within parallel processor memory 1022). The partition unit 1020 may additionally or alternatively also interface with one of the memory units in parallel processor memory via a memory controller (not shown).

In graphics applications, the ROP 1026 is a processing unit that performs raster operations such as stencil, z test, blending, and the like. The ROP 1026 then outputs processed graphics data that is stored in graphics memory. In some embodiments the ROP 1026 includes or couples with a CODEC 1027 that includes compression logic to compress depth or color data that is written to memory or the L2 cache 1021 and decompress depth or color data that is read from memory or the L2 cache 1021. The compression logic can be lossless compression logic that makes use of one or more of multiple compression algorithms. The type of compression that is performed by the CODEC 1027 can vary based on the statistical characteristics of the data to be compressed. For example, in one embodiment, delta color compression is performed on depth and color data on a per-tile basis. In one embodiment the CODEC 1027 includes compression and decompression logic that can compress and decompress compute data associated with machine learning operations. The CODEC 1027 can, for example, compress sparse matrix data for sparse machine learning operations. The CODEC 1027 can also compress sparse matrix data that is encoded in a sparse matrix format (e.g., coordinate list encoding (COO), compressed sparse row (CSR), compress sparse column (CSC), etc.) to generate compressed and encoded sparse matrix data. The compressed and encoded sparse matrix data can be decompressed and/or decoded before being processed by processing elements or the processing elements can be configured to consume compressed, encoded, or compressed and encoded data for processing.

The ROP 1026 may be included within at least one processing cluster (e.g., cluster 1014A-1014N of FIG. 10A) instead of within the partition unit 1020. In such embodiment, read and write requests for pixel data are transmitted over the memory crossbar 1016 instead of pixel fragment data. The processed graphics data may be displayed on a display device, such as one of the one or more display device(s), routed for further processing by processor(s), or routed for further processing by one of the processing entities within a parallel processor 1000.

Figure 10C:
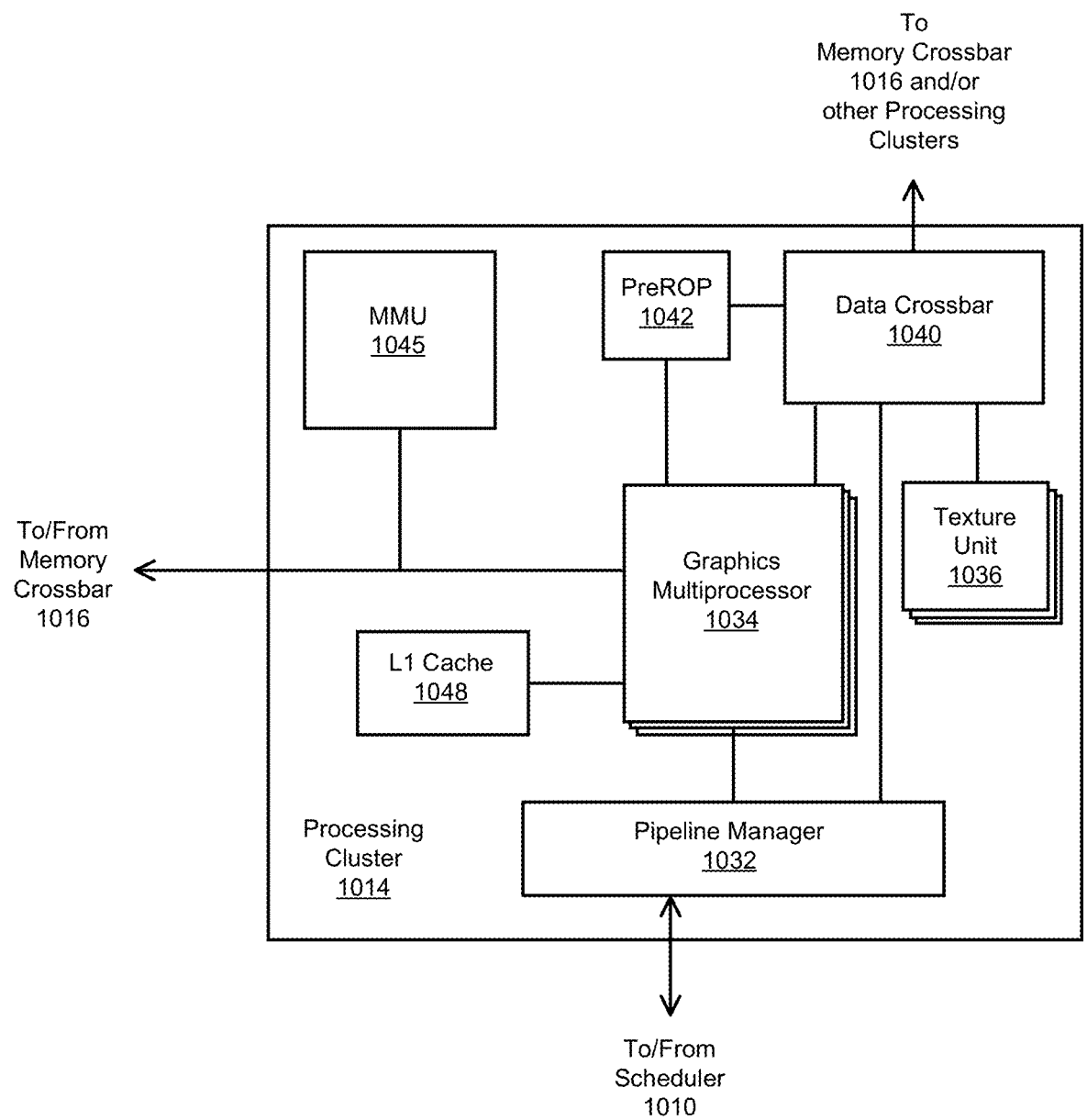

FIG. 10C is a block diagram of a processing cluster 1014 within a parallel processing unit. For example, the processing cluster is an instance of one of the processing clusters 1014A-1014N of FIG. 10A. The processing cluster 1014 can be configured to execute many threads in parallel, where the term "thread" refers to an instance of a particular program executing on a particular set of input data. Optionally, single-instruction, multiple-data (SIMD) instruction issue techniques may be used to support parallel execution of a large number of threads without providing multiple independent instruction units. Alternatively, single-instruction, multiple-thread (SIMT) techniques may be used to support parallel execution of a large number of generally synchronized threads, using a common instruction unit configured to issue instructions to a set of processing engines within at least one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 1014 can be controlled via a pipeline manager 1032 that distributes processing tasks to SIMT parallel processors. The pipeline manager 1032 receives instructions from the scheduler 1010 of FIG. 10A and manages execution of those instructions via a graphics multiprocessor 1034 and/or a texture unit 1036. The illustrated graphics multiprocessor 1034 is an exemplary instance of a SIMT parallel processor. However, various types of SIMT parallel processors of differing architectures may be included within the processing cluster 1014. One or more instances of the graphics multiprocessor 1034 can be included within a processing cluster 1014. The graphics multiprocessor 1034 can process data and a data crossbar 1040 can be used to distribute the processed data to one of multiple possible destinations, including other shader units. The pipeline manager 1032 can facilitate the distribution of processed data by specifying destinations for processed data to be distributed via the data crossbar 1040.

At least one of graphics multiprocessor 1034 within the processing cluster 1014 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. The same functional-unit hardware could be leveraged to perform different operations and other combinations of functional units may be present.

The instructions transmitted to the processing cluster 1014 constitute a thread. A set of threads executing across the set of parallel processing engines is a thread group. A thread group executes the same program on different input data. At least one thread within a thread group can be assigned to a different processing engine within a graphics multiprocessor 1034. A thread group may include fewer threads than the number of processing engines within the graphics multiprocessor 1034. When a thread group includes fewer threads than the number of processing engines, one or more of the processing engines may be idle during cycles in which that thread group is being processed. A thread group may also include more threads than the number of processing engines within the graphics multiprocessor 1034. When the thread group includes more threads than the number of processing engines within the graphics multiprocessor 1034, processing can be performed over consecutive clock cycles. Optionally, multiple thread groups can be executed concurrently on the graphics multiprocessor 1034.

The graphics multiprocessor 1034 may include an internal cache memory to perform load and store operations. Optionally, the graphics multiprocessor 1034 can forego an internal cache and use a cache memory (e.g., level 1 (L1) cache 1048) within the processing cluster 1014. At least one graphics multiprocessor 1034 also has access to level 2 (L2) caches within the partition units (e.g., partition units 1020A-1020N of FIG. 10A) that are shared among all processing clusters 1014 and may be used to transfer data between threads. The graphics multiprocessor 1034 may also access off-chip global memory, which can include one or more of local parallel processor memory and/or system memory. A memory external to the parallel processing unit 1002 may be used as global memory. Embodiments in which the processing cluster 1014 includes multiple instances of the graphics multiprocessor 1034 can share common instructions and data, which may be stored in the L1 cache 1048.

At least one processing cluster 1014 may include an MMU 1045 (memory management unit) that is configured to map virtual addresses into physical addresses. In other embodiments, one or more instances of the MMU 1045 may reside within the memory interface 1018 of FIG. 10A. The MMU 1045 includes a set of page table entries (PTEs) used to map a virtual address to a physical address of a tile and optionally a cache line index. The MMU 1045 may include address translation lookaside buffers (TLB) or caches that may reside within the graphics multiprocessor 1034 or the L1 cache 1048 of processing cluster 1014. The physical address is processed to distribute surface data access locality to allow efficient request interleaving among partition units. The cache line index may be used to determine whether a request for a cache line is a hit or miss.

In graphics and computing applications, a processing cluster 1014 may be configured such that at least one graphics multiprocessor 1034 is coupled to a texture unit 1036 for performing texture mapping operations, e.g., determining texture sample positions, reading texture data, and filtering the texture data. Texture data is read from an internal texture L1 cache (not shown) or in some embodiments from the L1 cache within graphics multiprocessor 1034 and is fetched from an L2 cache, local parallel processor memory, or system memory, as needed. At least one graphics multiprocessor 1034 outputs processed tasks to the data crossbar 1040 to provide the processed task to another processing cluster 1014 for further processing or to store the processed task in an L2 cache, local parallel processor memory, or system memory via the memory crossbar 1016. A preROP 1042 (pre-raster operations unit) is configured to receive data from graphics multiprocessor 1034, direct data to ROP units, which may be located with partition units as described herein (e.g., partition units 1020A-1020N of FIG. 10A). The preROP 1042 unit can perform optimizations for color blending, organize pixel color data, and perform address translations.

It will be appreciated that the core architecture described herein is illustrative and that variations and modifications are possible. Other numbers of processing units, e.g., graphics multiprocessor 1034, texture units 1036, preROPs 1042, etc., may be included within a processing cluster 1014. Further, while only one processing cluster 1014 is shown, a parallel processing unit as described herein may include other numbers of instances of the processing cluster 1014. Optionally, at least one processing cluster 1014 can be configured to operate independently of other processing clusters 1014 using separate and distinct processing units, L1 caches, L2 caches, etc.

Figure 10D:
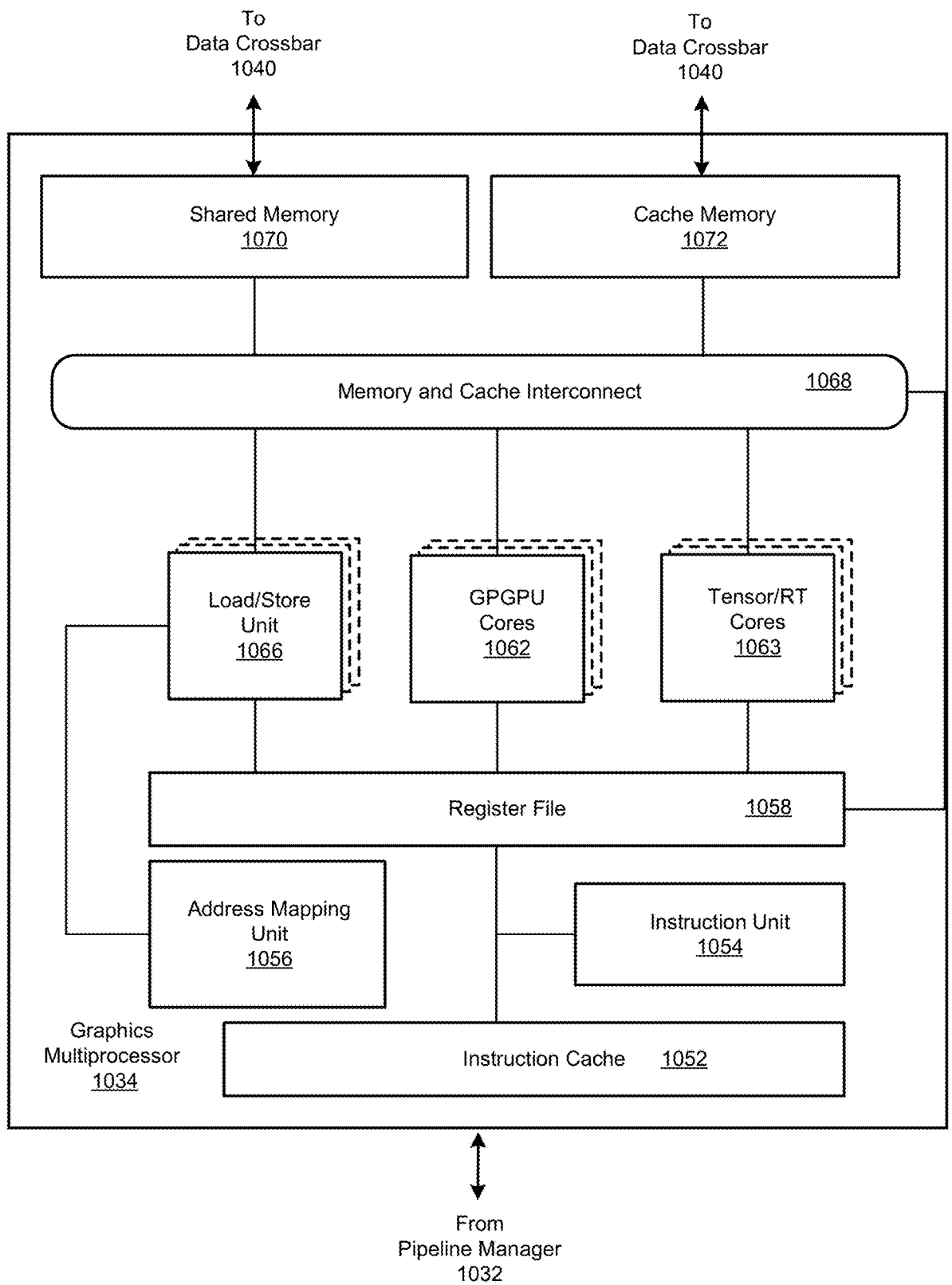

FIG. 10D shows an example of the graphics multiprocessor 1034 in which the graphics multiprocessor 1034 couples with the pipeline manager 1032 of the processing cluster 1014. The graphics multiprocessor 1034 has an execution pipeline including but not limited to an instruction cache 1052, an instruction unit 1054, an address mapping unit 1056, a register file 1058, one or more general purpose graphics processing unit (GPGPU) cores 1062, and one or more load/store units 1066. The GPGPU cores 1062 and load/store units 1066 are coupled with cache memory 1072 and shared memory 1070 via a memory and cache interconnect 1068. The graphics multiprocessor 1034 may additionally include tensor and/or ray-tracing cores 1063 that include hardware logic to accelerate matrix and/or ray-tracing operations.

The instruction cache 1052 may receive a stream of instructions to execute from the pipeline manager 1032. The instructions are cached in the instruction cache 1052 and dispatched for execution by the instruction unit 1054. The instruction unit 1054 can dispatch instructions as thread groups (e.g., warps), with at least one thread of the thread group assigned to a different execution unit within GPGPU core 1062. An instruction can access a local, shared, or global address space by specifying an address within a unified address space. The address mapping unit 1056 can be used to translate addresses in the unified address space into a distinct memory address that can be accessed by the load/store units 1066.

The register file 1058 provides a set of registers for the functional units of the graphics multiprocessor 1034. The register file 1058 provides temporary storage for operands connected to the data paths of the functional units (e.g., GPGPU cores 1062, load/store units 1066) of the graphics multiprocessor 1034. The register file 1058 may be divided between at least one of the functional units such that at least one functional unit is allocated a dedicated portion of the register file 1058. For example, the register file 1058 may be divided between the different warps being executed by the graphics multiprocessor 1034.

The GPGPU cores 1062 can include floating point units (FPUs) and/or integer arithmetic logic units (ALUs) that are used to execute instructions of the graphics multiprocessor 1034. In some implementations, the GPGPU cores 1062 can include hardware logic that may otherwise reside within the tensor and/or ray-tracing cores 1063. The GPGPU cores 1062 can be similar in architecture or can differ in architecture. For example and in one embodiment, a first portion of the GPGPU cores 1062 include a single precision FPU and an integer ALU while a second portion of the GPGPU cores include a double precision FPU. Optionally, the FPUs can implement the IEEE 754-2008 standard for floating point arithmetic or enable variable precision floating point arithmetic. The graphics multiprocessor 1034 can additionally include one or more fixed function or special function units to perform specific functions such as copy rectangle or pixel blending operations. One or more of the GPGPU cores can also include fixed or special function logic.

The GPGPU cores 1062 may include SIMD logic capable of performing a single instruction on multiple sets of data. Optionally, GPGPU cores 1062 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 1068 is an interconnect network that connects at least one of the functional units of the graphics multiprocessor 1034 to the register file 1058 and to the shared memory 1070. For example, the memory and cache interconnect 1068 is a crossbar interconnect that allows the load/store unit 1066 to implement load and store operations between the shared memory 1070 and the register file 1058. The register file 1058 can operate at the same frequency as the GPGPU cores 1062, thus data transfer between the GPGPU cores 1062 and the register file 1058 is very low latency. The shared memory 1070 can be used to enable communication between threads that execute on the functional units within the graphics multiprocessor 1034. The cache memory 1072 can be used as a data cache for example, to cache texture data communicated between the functional units and the texture unit 1036. The shared memory 1070 can also be used as a program managed cached. The shared memory 1070 and the cache memory 1072 can couple with the data crossbar 1040 to enable communication with other components of the processing cluster. Threads executing on the GPGPU cores 1062 can programmatically store data within the shared memory in addition to the automatically cached data that is stored within the cache memory 1072.

Figure 11:
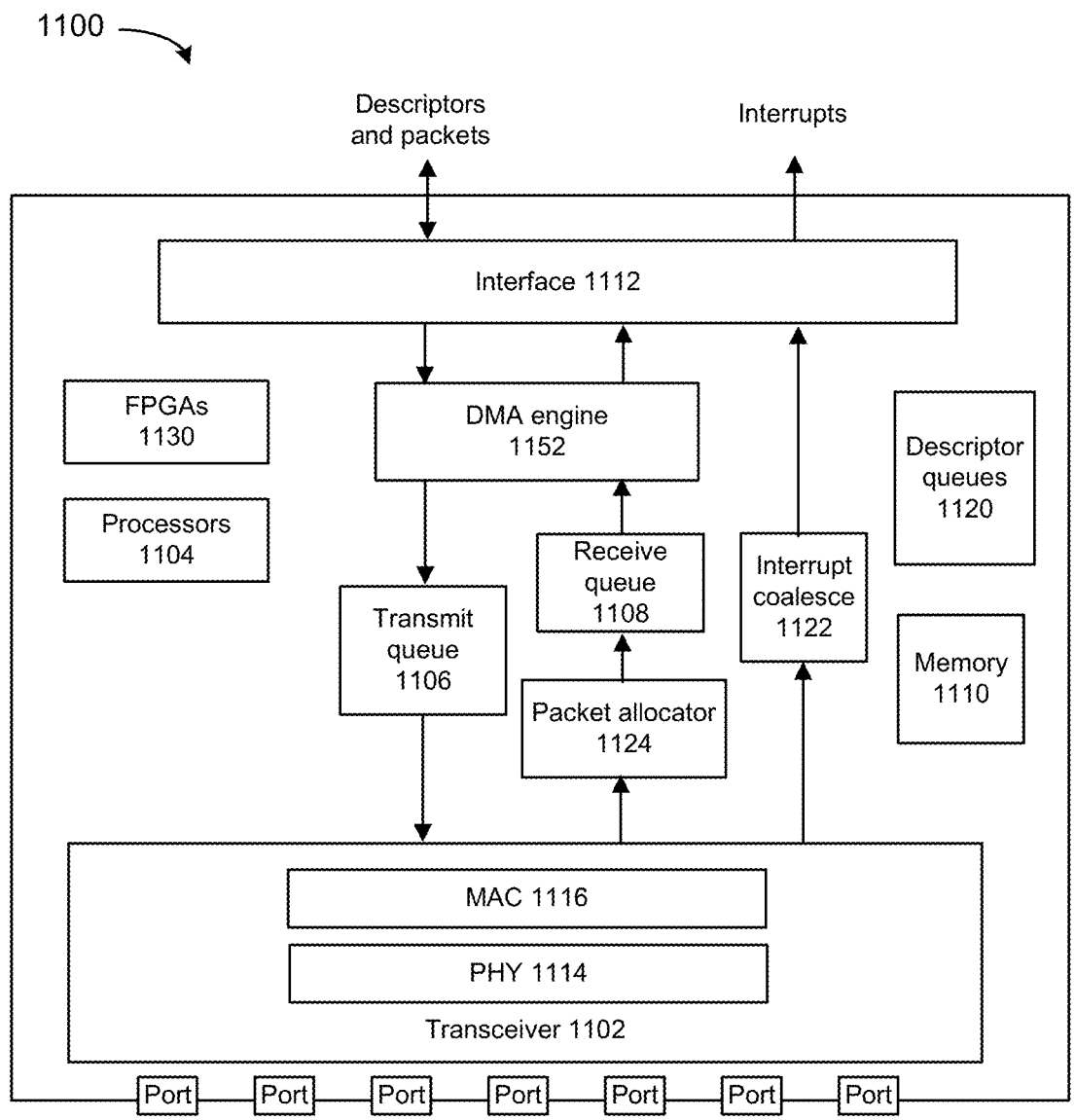
FIG. 11 depicts an example network interface device.

FIG. 11 depicts an example network interface device. Various hardware and software resources in the network interface can be in a GPU-integrated NIC, network interface device, or smartNIC, as described herein. In some examples, network interface 1100 can be implemented as a network interface controller, network interface card, a host fabric interface (HFI), or host bus adapter (HBA), and such examples can be interchangeable. Network interface 1100 can be coupled to one or more servers using a bus, PCIe, CXL, or DDR. Network interface 1100 may be embodied as part of a system-on-a-chip (SoC) that includes one or more processors, or included on a multichip package that also contains one or more processors.

Some examples of network device 1100 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1100 can include transceiver 1102, processors 1104, transmit queue 1106, receive queue 1108, memory 1110, and bus interface 1112, and DMA engine 1152. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include PHY circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to perform MAC address filtering on received packets, process MAC headers of received packets by verifying data integrity, remove preambles and padding, and provide packet content for processing by higher layers. MAC circuitry 1116 can be configured to assemble data to be transmitted into packets, that include destination and source addresses along with network control information and error detection hash values.

Processors 1104 can be a combination of: a processor, core, graphics processing unit (GPU), field programmable gate array (FPGA), application specific integrated circuit (ASIC), or other programmable hardware device that allow programming of network interface 1100. For example, a "smart network interface" or SmartNIC can provide packet processing capabilities in the network interface using processors 1104.

Processors 1104 can include a programmable processing pipeline that is programmable by one or more of: Protocol-independent Packet Processors (P4), Software for Open Networking in the Cloud (SONiC), Broadcom® Network Programming Language (NPL), Nvidia® CUDA®, DOCA™, Infrastructure Programmer Development Kit (IPDK), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 1124 can provide distribution of received packets for processing by multiple CPUs or cores using receive side scaling (RSS). When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1152 can copy a packet header, packet payload, and/or descriptor directly from host memory to the network interface or vice versa, instead of copying the packet to an intermediate buffer at the host and then using another copy operation from the intermediate buffer to the destination buffer.

Memory 1110 can be a type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Bus interface 1112 can provide an interface with host device (not depicted). For example, bus interface 1112 can be compatible with or based at least in part on PCI, PCI Express, PCI-x, Serial ATA, and/or USB (although other interconnection standards may be used), or proprietary variations thereof.

Figure 12:
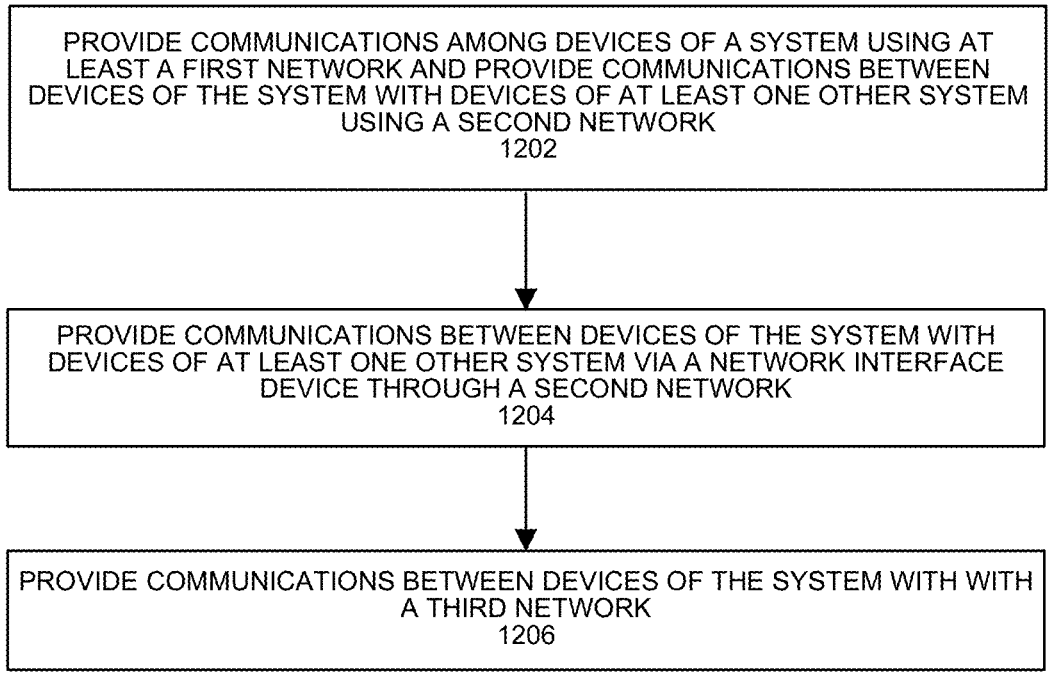
FIG. 12 depicts an example process.

FIG. 12 depicts an example process. At 1202, a system with at least one graphics processing unit with integrated network interface controllers can be connected to at least three networks. A first of the at least two networks can include a GPU-to-GPU connection for connecting GPUs of the system to other GPUs in the system. A second of the at least two networks can include a scale-out fabric. The scale-out fabric can be used to provide communications between CPUs, GPUs, or other devices (e.g., accelerators) of the system with CPUs, GPUs, or other devices (e.g., accelerators) of one or more other systems. Communications via the first and/or second networks can utilize a reliability protocol.

At 1204, a network interface device of the system with at least one graphics processing unit with integrated network interface controllers can be connected to the second switching network. For example, the network interface device can include a discrete network interface device that is communicatively coupled to at least one GPU and provides communications, via the second switching network, between CPUs, GPUs, or other devices (e.g., accelerators) of the system with CPUs, GPUs, or other devices (e.g., accelerators) of one or more other systems.

At 1206, a second network interface device of the system with at least one graphics processing unit with integrated network interface controllers can be connected to a third network. The third network can include a storage and control network. The storage and control network can provide communications for configuring operations of CPUs, GPUs, devices (e.g., accelerators), the network interface device, and/or one or more integrated network interface controllers. Operations can include storage protocols or security features (e.g., VLAN, VxLAN, partitioning, encryption, etc.). For example, the storage and control network can provide communications among CPUs, GPUs, devices (e.g., accelerators), the network interface device, and/or one or more integrated network interface controllers and CPUs, GPUs, devices (e.g., accelerators), the network interface device, and/or one or more integrated network interface controllers of one or more other system nodes.

Figure 13:
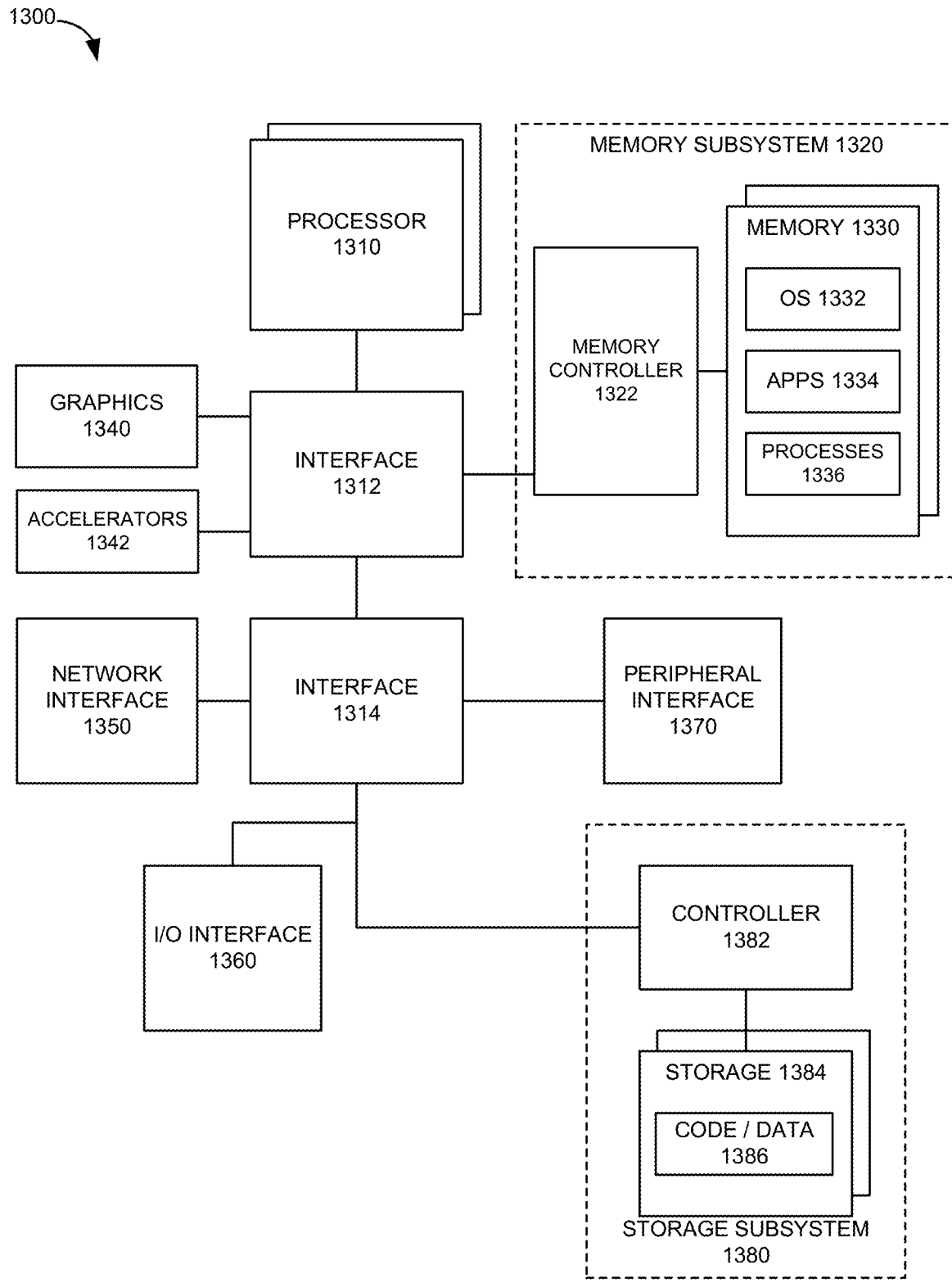
FIG. 13 depicts an example system.

FIG. 13 depicts an example computing system. Components of system 1300 (e.g., processor 1310, accelerators 1342, network interface 1350, memory subsystem 1320, and so forth) can be utilized in a system node, as described herein. System 1300 includes processor 1310, which provides processing, operation management, and execution of instructions for system 1300. Processor 1310 can include any type of microprocessor, central processing unit (CPU), graphics processing unit (GPU), processing core, or other processing hardware to provide processing for system 1300, or a combination of processors. Processor 1310 controls the overall operation of system 1300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1300 includes interface 1312 coupled to processor 1310, which can represent a higher speed interface or a high throughput interface for system components that needs higher bandwidth connections, such as memory subsystem 1320 or graphics interface components 1340, or accelerators 1342. Interface 1312 represents an interface circuit, which can be a standalone component or integrated onto a processor die. Where present, graphics interface 1340 interfaces to graphics components for providing a visual display to a user of system 1300. In one example, graphics interface 1340 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1340 generates a display based on data stored in memory 1330 or based on operations executed by processor 1310 or both. In one example, graphics interface 1340 generates a display based on data stored in memory 1330 or based on operations executed by processor 1310 or both.

Accelerators 1342 can be a fixed function or programmable offload engine that can be accessed or used by a processor 1310. For example, an accelerator among accelerators 1342 can provide compression (DC) capability, cryptography services such as public key encryption (PKE), cipher, hash/authentication capabilities, decryption, or other capabilities or services. In some embodiments, in addition or alternatively, an accelerator among accelerators 1342 provides field select controller capabilities as described herein. In some cases, accelerators 1342 can be integrated into a CPU socket (e.g., a connector to a motherboard or circuit board that includes a CPU and provides an electrical interface with the CPU). For example, accelerators 1342 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1342 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1320 represents the main memory of system 1300 and provides storage for code to be executed by processor 1310, or data values to be used in executing a routine. Memory subsystem 1320 can include one or more memory devices 1330 such as read-only memory (ROM), flash memory, one or more varieties of random access memory (RAM) such as DRAM, or other memory devices, or a combination of such devices. Memory 1330 stores and hosts, among other things, operating system (OS) 1332 to provide a software platform for execution of instructions in system 1300. Additionally, applications 1334 can execute on the software platform of OS 1332 from memory 1330. Applications 1334 represent programs that have their own operational logic to perform execution of one or more functions. Processes 1336 represent agents or routines that provide auxiliary functions to OS 1332 or one or more applications 1334 or a combination. OS 1332, applications 1334, and processes 1336 provide software logic to provide functions for system 1300. In one example, memory subsystem 1320 includes memory controller 1322, which is a memory controller to generate and issue commands to memory 1330. It will be understood that memory controller 1322 could be a physical part of processor 1310 or a physical part of interface 1312. For example, memory controller 1322 can be an integrated memory controller, integrated onto a circuit with processor 1310.

While not specifically illustrated, it will be understood that system 1300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1300 includes interface 1314, which can be coupled to interface 1312. In one example, interface 1314 represents an interface circuit, which can include standalone components and integrated circuitry. In one example, multiple user interface components or peripheral components, or both, couple to interface 1314. Network interface 1350 provides system 1300 the ability to communicate with remote devices (e.g., servers or other computing devices) over one or more networks. Network interface 1350 can include an Ethernet adapter, wireless interconnection components, cellular network interconnection components, USB (universal serial bus), or other wired or wireless standards-based or proprietary interfaces. Network interface 1350 can transmit data to a device that is in the same data center or rack or a remote device, which can include sending data stored in memory.

Network interface 1350 can include one or more of: a network interface controller (NIC), a remote direct memory access (RDMA)-enabled NIC, SmartNIC, router, switch, or network-attached appliance. Some examples of network interface 1350 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU.

In one example, system 1300 includes one or more input/output (I/O) interface(s) 1360. I/O interface 1360 can include one or more interface components through which a user interacts with system 1300 (e.g., audio, alphanumeric, tactile/touch, or other interfacing). Peripheral interface 1370 can include any hardware interface not specifically mentioned above. Peripherals refer generally to devices that connect dependently to system 1300. A dependent connection is one where system 1300 provides the software platform or hardware platform or both on which operation executes, and with which a user interacts.

In one example, system 1300 includes storage subsystem 1380 to store data in a nonvolatile manner. In one example, in certain system implementations, at least certain components of storage 1380 can overlap with components of memory subsystem 1320. Storage subsystem 1380 includes storage device(s) 1384, which can be or include any conventional medium for storing large amounts of data in a nonvolatile manner, such as one or more magnetic, solid state, or optical based disks, or a combination. Storage 1384 holds code or instructions and data 1386 in a persistent state (e.g., the value is retained despite interruption of power to system 1300). Storage 1384 can be generically considered to be a "memory," although memory 1330 is typically the executing or operating memory to provide instructions to processor 1310. Whereas storage 1384 is nonvolatile, memory 1330 can include volatile memory (e.g., the value or state of the data is indeterminate if power is interrupted to system 1300). In one example, storage subsystem 1380 includes controller 1382 to interface with storage 1384. In one example controller 1382 is a physical part of interface 1314 or processor 1310 or can include circuits or logic in both processor 1310 and interface 1314.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 1300. More specifically, power source typically interfaces to one or multiple power supplies in system 1300 to provide power to the components of system 1300. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1300 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel® Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network that provides die-to-die communications; chip-to-chip communications; circuit board-to-circuit board communications; and/or package-to-package communications.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, various systems of GPUs and network interface devices described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, edge network computing elements, multi-access edge computing (MEC), cloud gaming servers, fog network elements, and/or hybrid data centers (e.g., data center that use virtualization, cloud and software-defined networking to deliver application workloads across physical data centers and distributed multi-cloud environments).

Figure 14:
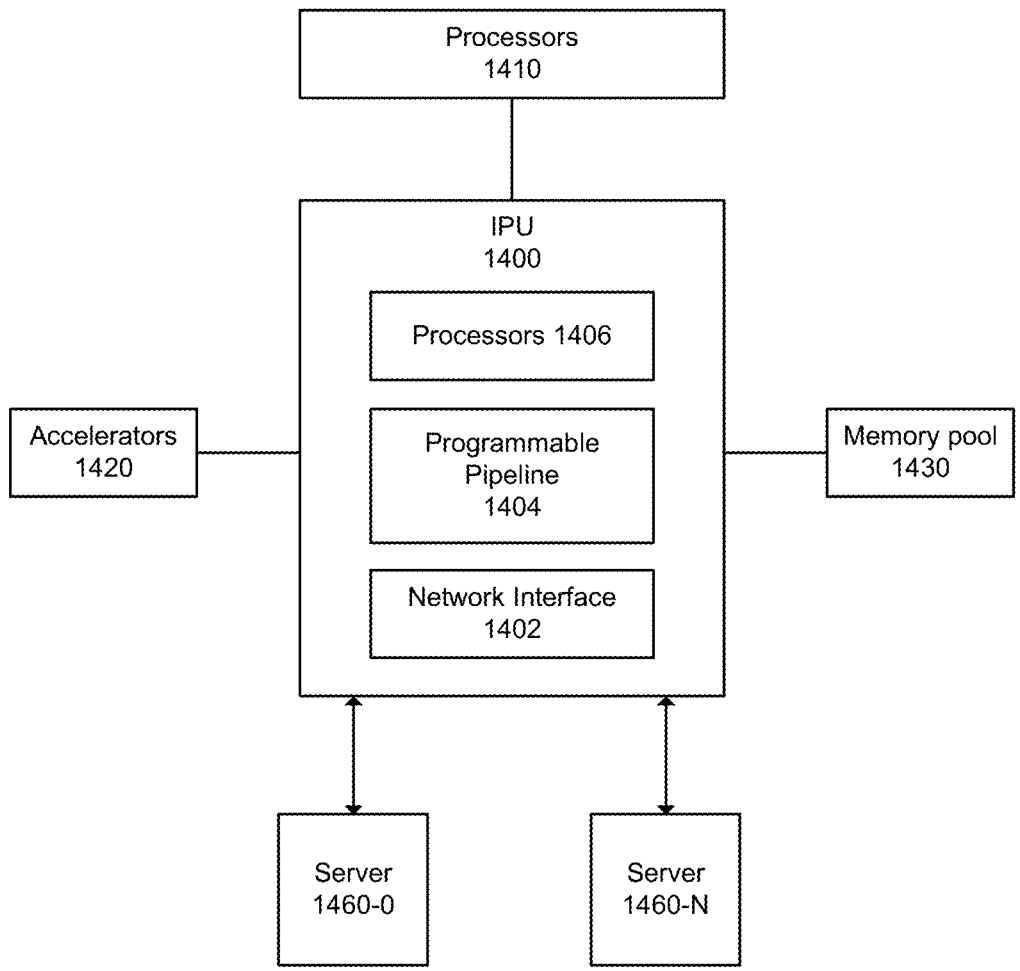
FIG. 14 depicts an example system.

FIG. 14 depicts an example network interface device. Network interface device 1400 manages performance of one or more processes using one or more of processors 1406, processors 1410, accelerators 1420, memory pool 1430, or servers 1440-0 to 1440-N, where N is an integer of 1 or more. In some examples, processors 1406 of network interface device 1400 can execute one or more processes, applications, VMs, containers, microservices, and so forth that request performance of workloads by one or more of: processors 1410, accelerators 1420, memory pool 1430, and/or servers 1440-0 to 1440-N. Network interface device 1400 can utilize network interface 1402 or one or more device interfaces to communicate with processors 1410, accelerators 1420, memory pool 1430, and/or servers 1440-0 to 1440-N. Network interface device 1400 can utilize programmable pipeline 1404 to process packets that are to be transmitted from network interface 1402 or packets received from network interface 1402.

Programmable pipeline 1404 and/or processors 1406 can be configured or programmed using languages based on one or more of: P4, Software for Open Networking in the Cloud (SONiC), C, Python, Broadcom Network Programming Language (NPL), Nvidia® CUDA®, Nvidia® DOCA™, Infrastructure Programmer Development Kit (IPDK), or x86 compatible executable binaries or other executable binaries.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a first graphics processing unit (GPU) with at least one integrated communications system, wherein the at least one integrated communications system is to apply a reliability protocol to communicate with a second at least one integrated communications system associated with a second GPU to copy data from a first memory region to a second memory region and wherein the first memory region is associated with the first GPU and the second memory region is associated with the second GPU.

Example 2 includes one or more examples, wherein the at least one integrated communications system comprises a communications system integrated into a same integrated circuit or system on chip (SoC) as that of the first GPU and the second at least one integrated communications system comprises a communications system integrated into a same integrated circuit or SoC as that of the first GPU and the second GPU.

Example 3 includes one or more examples, wherein the at least one integrated communications system comprises: direct memory access (DMA) circuitry; reliable transport circuitry; and a network interface controller.

Example 4 includes one or more examples, wherein the at least one integrated communications system is to perform topology discovery to discover the second at least one integrated communications system.

Example 5 includes one or more examples, comprising a device interface to communicatively couple the at least one integrated communications system to one or more execution units of the first GPU.

Example 6 includes one or more examples, comprising a first memory associated with the first GPU and a second memory associated with the second GPU, wherein the first memory comprises a source of data and the second memory comprises a destination of data.

Example 7 includes one or more examples, comprising: a network interface device to receive and apply control configurations for the at least one integrated communications system and the second at least one integrated communications system.

Example 8 includes one or more examples, wherein the at least one integrated communications system and the second at least one integrated communications system are to communicate with at least one GPU of another system.

Example 9 includes one or more examples, comprising: a network interface device to provide communications among the first GPU, the second GPU, and at least one GPU of another system.

Example 10 includes one or more examples, comprising: at least one central processing unit communicatively coupled to the first GPU and the second GPU, wherein the at least one central processing unit is to communicate with at least one GPU of another system using the at least one integrated communications system and the second at least one integrated communications system.

Example 11 includes one or more examples, comprising: a GPU-to-GPU connection to provide communication between the at least one integrated communications system and the second at least one integrated communications system.

Example 12 includes one or more examples, comprising: fabric to provide communication among the first and second GPUs and at least one GPU of another system.

Example 13 includes one or more examples, and includes at least one non-transitory computer-readable medium comprising instructions stored thereon, that if executed, cause one or more processors to: configure at least one network interface device of a first graphics processing unit (GPU) to configure data planes of one or more other network interface devices, wherein the at least one network interface device is to use a reliability protocol to communicate with another at least one network interface device associated with a second GPU to copy data from a first memory to a second memory and wherein the first memory is associated with the first GPU and the second memory is associated with the second GPU.

Example 14 includes one or more examples, comprising instructions stored thereon, that if executed, cause one or more processors to: perform topology discovery to discover at least one network interface device.

Example 15 includes one or more examples, wherein: the at least one network interface device of a first GPU comprises a communications system integrated into a same integrated circuit or system on chip (SoC) as that of the first GPU and the another at least one network interface device associated with a second GPU comprises a communications system integrated into a same integrated circuit or SoC as that of the second GPU.

Example 16 includes one or more examples, and includes a method comprising: in an integrated circuit with multiple a graphics processing units (GPUs): providing communications among the multiple GPUs by communications systems integrated into the multiple GPUs and a GPU-to-GPU connection, providing communications among the multiple GPUs and at least one GPU of another integrated circuitry by a communications systems integrated into the multiple GPUs and a switching network, configuring the communications systems integrated into the multiple GPUs by a network interface device coupled to a control network.

Example 17 includes one or more examples, wherein a first communications systems of the communications systems integrated into the multiple GPUs is integrated into a same integrated circuit or system on chip (SoC) as that of a first GPU of the multiple GPUs and a second communications systems of the communications systems integrated into the multiple GPUs is integrated into a same integrated circuit or SoC as that of a second GPU of the multiple GPUs.

Example 18 includes one or more examples, wherein the communications among the multiple GPUs utilize reliable transport.

Example 19 includes one or more examples, comprising: one or more switches, in a scale out network, performing topology discovery to discover at least one GPU of the multiple GPUs.

Example 20 includes one or more examples, comprising: providing communications among central processing units, accelerators, and GPUs by selection among at least one of the communications systems integrated into the multiple GPUs or a network interface device.

What is claimed is:

1. An apparatus comprising:
a first graphics processing unit (GPU) with at least one integrated communications system, wherein the at least one integrated communications system is to apply a reliability protocol to communicate with a second at least one integrated communications system associated with a second GPU to copy data from a first memory region to a second memory region and wherein the first memory region is associated with the first GPU and the second memory region is associated with the second GPU.

2. The apparatus of claim 1, wherein
the at least one integrated communications system comprises a communications system integrated into a same integrated circuit or system on chip (SoC) as that of the first GPU and
the second at least one integrated communications system comprises a communications system integrated into a same integrated circuit or SoC as that of the first GPU and the second GPU.

3. The apparatus of claim 1, wherein the at least one integrated communications system comprises:
direct memory access (DMA) circuitry;
reliable transport circuitry; and
a network interface controller.

4. The apparatus of claim 1, wherein the at least one integrated communications system is to perform topology discovery to discover the second at least one integrated communications system.

5. The apparatus of claim 1, comprising a device interface to communicatively couple the at least one integrated communications system to one or more execution units of the first GPU.

6. The apparatus of claim 1, comprising a first memory associated with the first GPU and a second memory associated with the second GPU, wherein the first memory comprises a source of data and the second memory comprises a destination of data.

7. The apparatus of claim 1, comprising:
a network interface device to receive and apply control configurations for the at least one integrated communications system and the second at least one integrated communications system.

8. The apparatus of claim 1, wherein the at least one integrated communications system and the second at least one integrated communications system are to communicate with at least one GPU of another system.

9. The apparatus of claim 1, comprising:
a network interface device to provide communications among the first GPU, the second GPU, and at least one GPU of another system.

10. The apparatus of claim 1, comprising:
at least one central processing unit communicatively coupled to the first GPU and the second GPU, wherein the at least one central processing unit is to communicate with at least one GPU of another system using the at least one integrated communications system and the second at least one integrated communications system.

11. The apparatus of claim 1, comprising:
a GPU-to-GPU connection to provide communication between the at least one integrated communications system and the second at least one integrated communications system.

12. The apparatus of claim 1, comprising:
fabric to provide communication among the first and second GPUs and at least one GPU of another system.

13. At least one non-transitory computer-readable medium comprising instructions stored thereon, that if executed, cause one or more processors to:
configure at least one network interface device of a first graphics processing unit (GPU) to configure data planes of one or more other network interface devices, wherein the at least one network interface device is to use a reliability protocol to communicate with another at least one network interface device associated with a second GPU to copy data from a first memory to a second memory and wherein the first memory is associated with the first GPU and the second memory is associated with the second GPU.

14. The computer-readable medium of claim 13, comprising instructions stored thereon, that if executed, cause one or more processors to:
perform topology discovery to discover at least one network interface device.

15. The computer-readable medium of claim 13, wherein:
the at least one network interface device of a first GPU comprises a communications system integrated into a same integrated circuit or system on chip (SoC) as that of the first GPU and
the another at least one network interface device associated with a second GPU comprises a communications system integrated into a same integrated circuit or SoC as that of the second GPU.

16. A method comprising:
in an integrated circuit with multiple graphics processing units (GPUs):
providing communications among the multiple GPUs by communications systems integrated into the multiple GPUs and a GPU-to-GPU connection,
providing communications among the multiple GPUs and at least one GPU of another integrated circuitry by a communications systems integrated into the multiple GPUs and a switching network,
configuring the communications systems integrated into the multiple GPUs by a network interface device coupled to a control network.

17. The method of claim 16, wherein:
a first communications systems of the communications systems integrated into the multiple GPUs is integrated into a same integrated circuit or system on chip (SoC) as that of a first GPU of the multiple GPUs and
a second communications systems of the communications systems integrated into the multiple GPUs is integrated into a same integrated circuit or SoC as that of a second GPU of the multiple GPUs.

18. The method of claim 17, wherein the communications among the multiple GPUs utilize reliable transport.

19. The method of claim 17, comprising:
one or more switches, in a scale out network, performing topology discovery to discover at least one GPU of the multiple GPUs.

20. The method of claim 17, comprising:
providing communications among central processing units, accelerators, and GPUs by selection among at least one of the communications systems integrated into the multiple GPUs or a network interface device.

* * * * *